(12) United States Patent
Tharrington, Jr. et al.

(10) Patent No.: US 10,510,022 B1
(45) Date of Patent: Dec. 17, 2019

(54) MACHINE LEARNING MODEL FEATURE CONTRIBUTION ANALYTIC SYSTEM

(71) Applicant: SAS Institute Inc., Cary, NC (US)

(72) Inventors: Ricky Dee Tharrington, Jr., Raleigh, NC (US); Xin Jiang Hunt, Cary, NC (US); Ralph Walter Abbey, Cary, NC (US)

(73) Assignee: SAS INSTITUTE INC., Cary, NC (US)

(*) Notice: Subject to any disclaimer, the term of this patent is extended or adjusted under 35 U.S.C. 154(b) by 0 days.

(21) Appl. No.: 16/451,228

(22) Filed: Jun. 25, 2019

Related U.S. Application Data

(60) Provisional application No. 62/774,592, filed on Dec. 3, 2018.

(51) Int. Cl.
*G06N 20/00* (2019.01)
*G06N 5/04* (2006.01)
*G06F 17/16* (2006.01)
*G06F 16/245* (2019.01)

(52) U.S. Cl.
CPC ........... *G06N 20/00* (2019.01); *G06F 16/245* (2019.01); *G06F 17/16* (2013.01); *G06N 5/04* (2013.01)

(58) Field of Classification Search
None
See application file for complete search history.

(56) References Cited

U.S. PATENT DOCUMENTS

| | | | | |
|---|---|---|---|---|
| 9,715,495 | B1* | 7/2017 | Tacchi | G06F 17/2785 |
| 9,792,562 | B1* | 10/2017 | Chen | G06N 7/005 |
| 10,133,811 | B2 | 11/2018 | Noma et al. | |
| 2002/0198688 | A1 | 12/2002 | Feldman | |
| 2009/0071224 | A1* | 3/2009 | Bornert | G01D 3/036 73/1.01 |
| 2017/0286835 | A1* | 10/2017 | Ho | G06N 5/02 |
| 2017/0308943 | A1* | 10/2017 | Scarasso | G06Q 30/0208 |
| 2018/0053071 | A1* | 2/2018 | Chen | G06N 5/003 |
| 2019/0043070 | A1* | 2/2019 | Merrill | G06N 20/00 |

(Continued)

OTHER PUBLICATIONS

Du et al. (Techniques for Interpretable Machine Learning, May 2019, pp. 1-9) (Year: 2019).*

(Continued)

*Primary Examiner* — George Giroux
(74) *Attorney, Agent, or Firm* — Bell & Manning, LLC

(57) ABSTRACT

Systems and methods for machine learning, models, and related explainability and interpretability are provided. A computing device determines a contribution of a feature to a predicted value. A feature computation dataset is defined based on a selected next selection vector. A prediction value is computed for each observation vector included in the feature computation dataset using a trained predictive model. An expected value is computed for the selected next selection vector based on the prediction values. The feature computation dataset is at least a partial copy of a training dataset with each variable value replaced in each observation vector included in the feature computation dataset based on the selected next selection vector. Each replaced variable value is replaced with a value included in a predefined query for a respective variable. A Shapley estimate value is computed for each variable.

30 Claims, 23 Drawing Sheets

(56) References Cited

U.S. PATENT DOCUMENTS

2019/0063215 A1* 2/2019 Dai ............... H03M 7/3062
2019/0138290 A1* 5/2019 Garvey ............. G06F 16/906

OTHER PUBLICATIONS

Sarah Ammerman, "Adverse Action Notice Requirements Under the ECOA and the FCRA," Consumer Compliance Outlook, 2013, 8 pages.
Interpreting a Model, http://docs.h2o/ai/driver-less-ai/latest-stable/docs/userguide/interpreting.html, 21 pages, printed Dec. 19, 2018.
Lundberg, Scott M., and Su-In Lee. "A unified approach to interpreting model predictions." Advances in Neural Information Processing Systems. 2017. arXiv preprint—might be slightly different than the journal print) https://arxiv.org/abs/1705.07874.
Staniak, Mateusz, and Przemyslaw Biecek. "Explanations of model predictions with live and breakDown packages." arXiv preprint arXiv:1804.01955 (2018). https://arxiv.org/pdf/1804.01955.pdf.
Kononenko, Igor. "An efficient explanation of individual classifications using game theory." Journal of Machine Learning Research Jan. 11, 2010: 1-18.
Ribeiro, Marco Tulio, Sameer Singh, and Carlos Guestrin. "Why should i trust you?: Explaining the predictions of any classifier." Proceedings of the 22nd ACM SIGKDD international conference on knowledge discovery and data mining. ACM, 2016.
Budzik et al., "Most AI Explainability is Snake Oil. Ours Isn't." Zest Finance; Real Explainability/ZAML; printed Dec. 19, 2018.
Hall, Patrick, et al, "Machine Learning Interpretability with H2O Driverless AI," (2017).
Tseng, Gabriel, "Interpreting complex models with SHAP values," https://medium.com/@gabrielteng/interpreting-complex-models-with-shap-values-1C187db6ec_83. 12 pages, printed 12/19/018.
LightGBM model explained by shap, https://www.kaggle.com/cast42/lightgbm-model-explained-by-shap, printed from Kaggle Dec. 19, 2018, 23 pages.
Ribeiro, et al., "Local Interpretable Model-Agnostic Explanations (LIME): An Introduction," Aug. 12, 2016, https://www.oreilly.com/learning/introduction-to-local-interpretable-model-agnostic-explanations-lime.
Alex Knapp, "Microsoft Partners with Fintech Startup ZestFinance to Bring Transparency to AI-Powered Financial Models," Forbes, Dec. 19, 2018.
Shap 0.21.0 pip install shap==0.21.0, https://pypi.org/project/shap/0.21.0/ printed from the internet Dec. 19, 2018, 8 pages.

* cited by examiner

| Var 1 | Var 2 | Var 3 | Var 4 | Var 5 | Var 6 |
|---|---|---|---|---|---|
| 0 | 0 | 0 | 0 | 0 | 0 |
| 1 | 0 | 0 | 0 | 0 | 0 |
| 0 | 1 | 0 | 0 | 0 | 0 |
| 0 | 0 | 1 | 0 | 0 | 0 |
| 0 | 0 | 0 | 1 | 0 | 0 |
| 0 | 0 | 0 | 0 | 1 | 0 |
| 0 | 0 | 0 | 0 | 0 | 1 |
| 0 | 1 | 1 | 1 | 1 | 1 |
| 1 | 0 | 1 | 1 | 1 | 1 |
| 1 | 1 | 0 | 1 | 1 | 1 |
| 1 | 1 | 1 | 0 | 1 | 1 |
| 1 | 1 | 1 | 1 | 0 | 0 |
| 1 | 1 | 1 | 1 | 1 | 1 |

FIG. 8

| METHOD | Time Duration Relative to Shapely Value Calculation | | | | |
|---|---|---|---|---|---|
| | Mean | Minimum | Lower Quartile | Median | Upper Quartile | Maximum |
| BREAKDOWN | 0.370 | 0.209 | 0.240 | 0.271 | 0.545 | 0.589 |
| APPLICATION 128 (1,0) | 0.033 | 0.025 | 0.030 | 0.034 | 0.036 | 0.037 |
| APPLICATION 128 (1,200) | 0.028 | 0.020 | 0.024 | 0.027 | 0.028 | 0.045 |
| APPLICATION 128 (4,1K) | 0.030 | 0.024 | 0.027 | 0.031 | 0.033 | 0.036 |
| APPLICATION 128 (4,200) | 0.026 | 0.021 | 0.024 | 0.026 | 0.028 | 0.030 |
| KERNEL1K | 0.393 | 0.365 | 0.371 | 0.395 | 0.407 | 0.426 |
| KERNEL200 | 0.384 | 0.365 | 0.368 | 0.379 | 0.391 | 0.421 |

| METHOD | Shapley Absolute Percent Error | | | | | |
|---|---|---|---|---|---|---|
| | Mean | Minimum | Lower Quartile | Median | Upper Quartile | Maximum |
| BREAKDOWN | 11.74 | 6E-13 | 0.287 | 13.23 | 21.88 | 29.69 |
| APPLICATION 128 (1,0) | 5.321 | 1E-12 | 0.001 | 3.358 | 10.70 | 18.07 |
| APPLICATION 128 (1,200) | 25.65 | 12.60 | 16.82 | 26.84 | 33.30 | 45.86 |
| APPLICATION 128 (4,1K) | 10.47 | 4.436 | 7.017 | 10.16 | 12.38 | 22.72 |
| APPLICATION 128 (4,200) | 18.98 | 11.34 | 14.56 | 17.52 | 20.80 | 32.69 |
| KERNEL1K | 97.68 | 66.31 | 76.81 | 87.62 | 118.1 | 163.3 |
| KERNEL200 | 114.4 | 66.05 | 83.51 | 116.5 | 142.8 | 160.0 |

| METHOD | Spearman's Correlation | | | | | |
|---|---|---|---|---|---|---|
| | Mean | Minimum | Lower Quartile | Median | Upper Quartile | Maximum |
| BREAKDOWN | 0.962 | 0.864 | 0.918 | 0.986 | 1.000 | 1.000 |
| APPLICATION 128 (1,0) | 0.998 | 0.982 | 1.000 | 1.000 | 1.000 | 1.000 |
| APPLICATION 128 (1,200) | 0.916 | 0.727 | 0.927 | 0.945 | 0.955 | 0.982 |
| APPLICATION 128 (4,1K) | 0.984 | 0.973 | 0.982 | 0.982 | 0.991 | 1.000 |
| APPLICATION 128 (4,200) | 0.946 | 0.891 | 0.900 | 0.955 | 0.982 | 1.000 |
| KERNEL1K | 0.722 | 0.327 | 0.664 | 0.759 | 0.882 | 0.927 |
| KERNEL200 | 0.694 | 0.455 | 0.573 | 0.686 | 0.845 | 0.927 |

FIG. 14

| METHOD | Time Duration Relative to Shapely Value Calculation | | | | | |
|---|---|---|---|---|---|---|
| | Mean | Minimum | Lower Quartile | Median | Upper Quartile | Maximum |
| BREAKDOWN | 0.130 | 0.086 | 0.092 | 0.105 | 0.185 | 0.216 |
| APPLICATION 128 (1,0) | 0.026 | 0.021 | 0.022 | 0.023 | 0.025 | 0.054 |
| APPLICATION 128 (1,200) | 0.017 | 0.011 | 0.012 | 0.013 | 0.015 | 0.052 |
| APPLICATION 128 (4,1K) | 0.017 | 0.013 | 0.015 | 0.016 | 0.018 | 0.024 |
| APPLICATION 128 (4,200) | 0.017 | 0.012 | 0.012 | 0.013 | 0.015 | 0.047 |
| KERNEL1K | 0.136 | 0.115 | 0.121 | 0.143 | 0.146 | 0.147 |
| KERNEL200 | 0.137 | 0.113 | 0.136 | 0.143 | 0.145 | 0.146 |

FIG. 16

| METHOD | Shapley Absolute Percent Error | | | | | |
|---|---|---|---|---|---|---|
| | Mean | Minimum | Lower Quartile | Median | Upper Quartile | Maximum |
| BREAKDOWN | 20.24 | 16.96 | 18.72 | 19.66 | 22.74 | 23.27 |
| APPLICATION 128 (1,0) | 18.22 | 0.970 | 1.832 | 7.273 | 46.79 | 55.59 |
| APPLICATION 128 (1,200) | 45.50 | 21.13 | 34.37 | 43.24 | 55.78 | 76.80 |
| APPLICATION 128 (4,1K) | 18.05 | 5.543 | 14.97 | 16.27 | 22.65 | 30.16 |
| APPLICATION 128 (4,200) | 59.43 | 32.04 | 42.60 | 52.28 | 83.34 | 97.57 |
| KERNEL1K | 97.40 | 51.96 | 74.74 | 88.45 | 107.3 | 179.9 |
| KERNEL200 | 180.6 | 124.1 | 143.0 | 172.5 | 197.3 | 291.9 |

| METHOD | Spearman's Correlation | | | | | |
|---|---|---|---|---|---|---|
| | Mean | Minimum | Lower Quartile | Median | Upper Quartile | Maximum |
| BREAKDOWN | 0.885 | 0.755 | 0.838 | 0.887 | 0.951 | 0.968 |
| APPLICATION 128 (1,0) | 0.977 | 0.891 | 0.964 | 0.991 | 1.000 | 1.000 |
| APPLICATION 128 (1,200) | 0.879 | 0.667 | 0.820 | 0.913 | 0.945 | 0.973 |
| APPLICATION 128 (4,1K) | 0.969 | 0.936 | 0.945 | 0.969 | 1.000 | 1.000 |
| APPLICATION 128 (4,200) | 0.850 | 0.555 | 0.755 | 0.882 | 0.936 | 1.000 |
| KERNEL1K | 0.654 | 0.391 | 0.545 | 0.664 | 0.736 | 0.900 |
| KERNEL200 | 0.540 | 0.264 | 0.373 | 0.559 | 0.755 | 0.773 |

FIG. 20

MACHINE LEARNING MODEL FEATURE CONTRIBUTION ANALYTIC SYSTEM

CROSS-REFERENCE TO RELATED APPLICATIONS

The present application claims the benefit of 35 U.S.C. § 119(e) to U.S. Provisional Patent Application No. 62/774,592 filed on Dec. 3, 2018, the entire contents of which is hereby incorporated by reference.

BACKGROUND

A predictive model may also be known as a "statistical model", a "machine learning model", an "artificial intelligence model", or by some other name. The important feature of these models is their use of one or more variables, known as inputs or independent variables, to calculate a value for another variable, known as a target or dependent variable. The method of calculation of the target variable is dependent on a type of predictive model. Many modern predictive models provide no means of interpreting their prediction results. The relationship between each input variable and the resulting target variable value is not readily discernible by the user of the predictive model. This inability to explain or interpret the predictive model results causes the user of the model to have lower confidence in how well the model is performing its task. Explaining or providing an interpretation of the predictive results may also provide insights into the operation of the system being modeled by the predictive model.

SUMMARY

In an example embodiment, a non-transitory computer-readable medium is provided having stored thereon computer-readable instructions that, when executed by a computing device, cause the computing device to determine a contribution of a feature to a predicted value. A selection vector matrix is defined that includes a plurality of selection vectors determined based on a predefined depth value. Each selection vector of the plurality of selection vectors indicates when a variable value of a plurality of variable values is replaced in an observation vector. (A) A next selection vector is selected from the defined selection vector matrix. (B) A feature computation dataset is defined based on the selected next selection vector. The feature computation dataset is at least a partial copy of a training dataset with the variable value of the plurality of variable values replaced in each observation vector included in the feature computation dataset based on the selected next selection vector. Each replaced variable value is replaced with a value included in a predefined query for a respective variable. (C) A prediction value is computed for each observation vector included in the defined feature computation dataset using a trained predictive model. (D) An expected value is computed for the selected selection vector based on the computed prediction value for each observation vector included in the defined feature computation dataset. (E) (A) to (D) are repeated a predefined plurality of times. (F) A Shapley estimate value is computed for each variable of a plurality of variables. Each variable value of the plurality of variable values is associated with one variable of the plurality of variables. (G) The computed Shapley estimate value is output for each variable of the plurality of variables as a contribution of each variable to a predicted value for the predefined query.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to determine a contribution of a feature to a predicted value.

In yet another example embodiment, a method determines a contribution of a feature to a predicted value.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 8 depicts a selection vector matrix defined by the feature generation application of the feature contribution device of FIG. 1 for the depth value equal to one with six variables in accordance with an illustrative embodiment.

FIG. 14 depicts a comparison of a Spearman's correlation generated by a plurality of algorithms in computing a feature contribution for a first dataset in accordance with an illustrative embodiment.

FIG. 16 depicts a comparison of a relative execution time of a plurality of algorithms in computing a feature contribution for a second dataset in accordance with an illustrative embodiment.

FIG. 20 depicts a comparison of a Spearman's correlation generated by a plurality of algorithms in computing a feature contribution for a second dataset in accordance with an illustrative embodiment.

DETAILED DESCRIPTION

Shapley values were first introduced in the context of game theory, but have recently been applied to the context of explaining predictive models. The explicit calculation of the Shapley values is given by:

$$\phi_i = \sum_{S \subset N \setminus i, s=|S|} \frac{s!(m-s-1)!}{m!}(f(S \cup i) - f(S))$$

where a coalition S is a subset of a grand coalition N, f(S) is a worth of coalition S, and there are m players. A coalition is a group of players. Shapley values have the following property:

$$f(N) = \sum_{i=1}^{m} \phi_i$$

To apply the Shapley values for the purpose of predictive model explanation, several substitutions are made: f(•) is a predictive model, m is a number of input variables (features), and the subsets are based on sampling a dataset. In the model explanation and interpretation context, the Shapley value for a given variable, $\phi_i$, is an expected change in a predicted value if any data point d has a value of an $i^{th}$ variable changed to be equal to a query value for that variable, controlling for the effects of the values of the other variables in the data point d on the model's prediction. A value, $\phi_0$, referred to as an intercept value, is added to the Shapley values, and corresponds to an expected model prediction without regard to any of the input variables. The Shapley values are used to explain how a model scores a query by attributing a portion of the predicted value to each variable. Thus, the Shapley values explain to a user how the variables contribute to the model's prediction of the query, and also indicate the variables that have the most influence on the model's prediction of the query. While the exact calculation for these values is known, this calculation scales very poorly as the number of variable increases, and quickly results in a prohibitively long time to calculate. The total computational complexity for Shapely values is $0(m2^m)$. This fact has motivated approximation algorithms to more efficiently calculate values that are close to the actual Shapley values.

Figure 1:
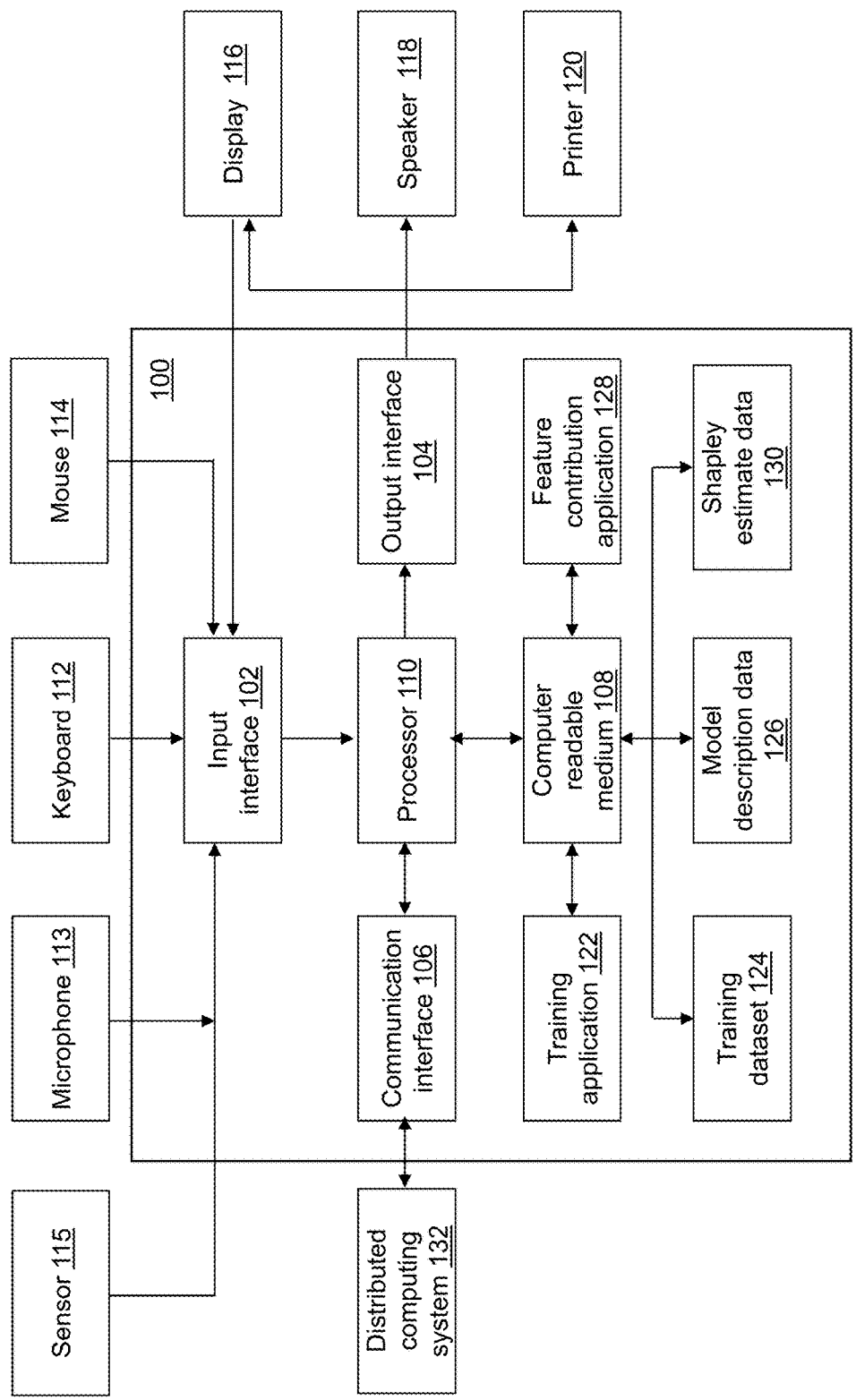
FIG. 1 depicts a block diagram of a feature contribution device in accordance with an illustrative embodiment.

Referring to FIG. 1, a block diagram of a feature contribution device 100 is shown in accordance with an illustrative embodiment. Feature contribution device 100 computes Shapley values faster and more accurately using less memory in comparison to existing approximate Shapley value algorithms to explain a contribution of a feature of a dataset to a predicted result. Feature contribution device 100 may include an input interface 102, an output interface 104, a communication interface 106, a non-transitory computer-readable medium 108, a processor 110, a training application 122, a training dataset 124, model description data 126, a feature contribution application 128, and Shapley estimate data 130. Fewer, different, and/or additional components may be incorporated into feature contribution device 100.

The improvements provided by feature contribution application 128 are shown and described below using two different real-world datasets as training dataset 124. The results from feature contribution application 128 are compared with existing Shapley approximation algorithms and four variants of feature contribution application 128. The results show fast, accurate estimation using feature contribution application 128. Less memory is used based on a smaller defined selection vector matrix as described further below.

Input interface 102 provides an interface for receiving information from the user or another device for entry into feature contribution device 100 as understood by those skilled in the art. Input interface 102 may interface with various input technologies including, but not limited to, a keyboard 112, a microphone 113, a mouse 114, a sensor 115, a display 116, a track ball, a keypad, one or more buttons, etc. to allow the user or another device to enter information into feature contribution device 100 or to make selections presented in a user interface displayed on display 116. The same interface may support both input interface 102 and output interface 104. For example, display 116 comprising a touch screen provides a mechanism for user input and for presentation of output to the user. Feature contribution device 100 may have one or more input interfaces that use the same or a different input interface technology. The input interface technology further may be accessible by feature contribution device 100 through communication interface 106.

Output interface 104 provides an interface for outputting information for review by a user of feature contribution device 100 and/or for use by another application or device. For example, output interface 104 may interface with various output technologies including, but not limited to, display 116, a speaker 118, a printer 120, etc. Feature contribution device 100 may have one or more output interfaces that use the same or a different output interface technology. The output interface technology further may be accessible by feature contribution device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Feature contribution device 100 may have one or more communication interfaces that use the same or a different communication interface technology. For example, feature contribution device 100 may support communication using an Ethernet port, a Bluetooth antenna, a telephone jack, a USB port, etc. Data and messages may be transferred between feature contribution device 100 and another computing device of distributed computing system 132 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. feature contribution device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Feature contribution device 100 also may have one or more drives that support the loading of a memory media such as a CD, DVD, an external hard drive, etc. One or more external hard drives further may be connected to feature contribution device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc.

Some processors may be central processing units (CPUs). Some processes may be more efficiently and speedily executed and processed with machine-learning specific processors (e.g., not a generic CPU). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional energy efficiencies, processing speed improvements, data communication speed improvements, and/or data efficiency response variables and improvements throughout various parts of the system.

Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Feature contribution device 100 may include a plurality of processors that use the same or a different processing technology.

Training application 122 performs operations associated with defining model description data 126 from data stored in training dataset 124. Some or all of the operations described herein may be embodied in training application 122. The operations may be implemented using hardware, firmware, software, or any combination of these methods.

Referring to the example embodiment of FIG. 1, training application 122 is implemented in software (comprised of computer-readable and/or computer-executable instructions) stored in computer-readable medium 108 and accessible by processor 110 for execution of the instructions that embody the operations of training application 122. Training application 122 may be written using one or more programming languages, assembly languages, scripting languages, etc. Training application 122 may be integrated with other analytic tools. As an example, training application 122 may be part of an integrated data analytics software application and/or software architecture such as that offered by SAS Institute Inc. of Cary, N.C., USA. Merely for illustration, training application 122 may be implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™, SAS® In-Database Products, SAS® Cloud Analytic Services, SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and observation classification are applicable in a wide variety of industries to solve technical problems.

Training application 122 may be implemented as a Web application. For example, training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Training dataset 124 may include, for example, a plurality of rows and a plurality of columns. The plurality of rows may be referred to as observation vectors or records (observations), and the columns may be referred to as variables. Each variable further may be referred to as a feature or a dimension. In an alternative embodiment, training dataset 124 may be transposed. A value may be defined for each variable of the plurality of variables to define an observation vector $x_i$. One or more variables of the plurality of variables may describe a characteristic of a physical object. For example, if training dataset 124 includes data related to operation of a vehicle, the variables may include an oil pressure, a speed, a gear indicator, a gas tank level, a tire pressure for each tire, an engine temperature, a radiator level, etc.

Data stored in training dataset 124 may be sensor measurements or signal values captured by a sensor, may be generated or captured in response to occurrence of an event or a transaction, generated by a device such as in response to an interaction by a user with the device, etc. Training dataset 124 may include data captured as a function of time for one or more physical objects. The data stored in training dataset 124 may be generated by and/or captured from a variety of sources including one or more sensors of the same or different type, one or more computing devices, etc.

The data stored in training dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. In data science, engineering, and statistical applications, data often consists of multiple measurements (across sensors, characteristics, responses, etc.) collected across multiple time instances (patients, test subjects, etc.). These measurements may be collected in training dataset 124 for analysis and processing.

Training dataset 124 may be stored on computer-readable medium 108 or on one or more computer-readable media of distributed computing system 132 and accessed by feature contribution device 100 using communication interface 106, input interface 102, and/or output interface 104. The data stored in training dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in training dataset 124 may be captured at different time points periodically, intermittently, when an event occurs, etc. One or more columns of training dataset 124 may include a time and/or date value.

Training dataset 124 may include data captured under normal operating conditions of the physical object. Training dataset 124 may include data captured at a high data rate such as 200 or more observation vectors per second for one or more physical objects. For example, data stored in training dataset 124 may be generated as part of the Internet of Things (IoT), where things (e.g., machines, devices, phones, sensors) can be connected to networks and the data from these things collected and processed within the things and/or external to the things before being stored in training dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in training dataset 124.

The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Training dataset 124 may be stored using various data structures as known to those skilled in the art including one or more files of a file system, a relational database, one or more tables of a system of tables, a structured query language database, etc. on feature contribution device 100 or on distributed computing system 132. Feature contribution device 100 may coordinate access to training dataset 124 that is distributed across distributed computing system 132 that may include one or more computing devices. For example, training dataset 124 may be stored in a cube distributed across a grid of computers as understood by a person of skill in the art. As another example, training dataset 124 may be stored in a multi-node Hadoop® cluster. For instance, Apache™ Hadoop® is an open-source software framework for distributed computing supported by the Apache Software Foundation. As another example, training dataset 124 may be stored in a cloud of computers and accessed using cloud computing technologies, as understood by a person of skill in the art. The SAS® LASR™ Analytic Server may be used as an analytic platform to enable multiple users to concurrently access data stored in training dataset 124. The SAS® Viya™ open, cloud-ready, in-memory architecture also may be used as an analytic platform to enable multiple users to concurrently access data stored in training dataset 124. SAS® Cloud Analytic Services (CAS) may be used as an analytic server with associated cloud services in SAS® Viya™ Some systems may use SAS In-Memory Statistics for Hadoop® to read big data once and analyze it several times by persisting it in-memory for the entire session. Some systems may be of other types and configurations.

Figure 2:
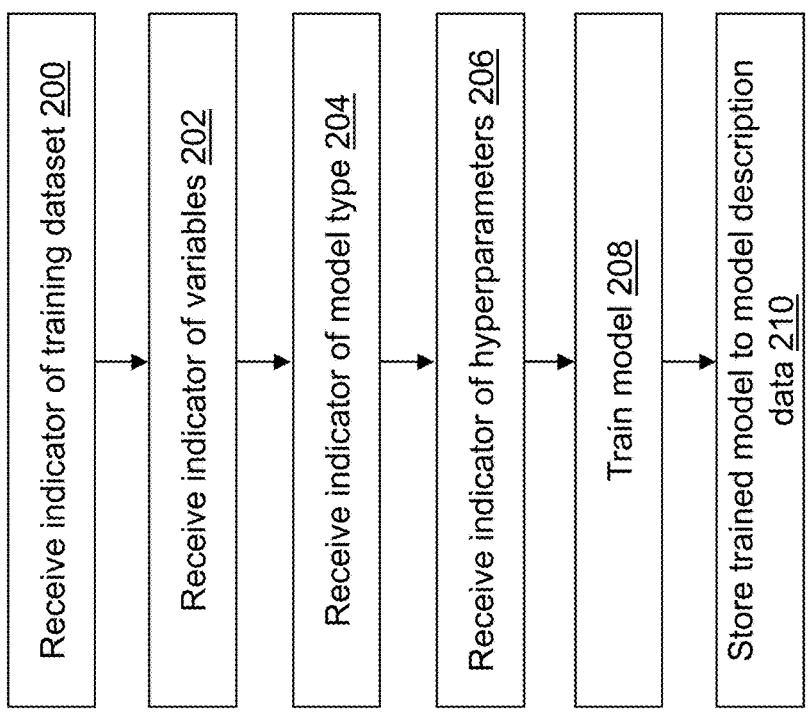
FIG. 2 depicts a flow diagram illustrating examples of operations performed by a training application of the feature contribution device of FIG. 1 in training a predictive model in accordance with an illustrative embodiment.

Referring to FIG. 2, example operations associated with training application 122 are described. Additional, fewer, or different operations may be performed depending on the embodiment of training application 122. The order of presentation of the operations of FIG. 2 is not intended to be limiting. Some of the operations may not be performed in some embodiments. Although some of the operational flows are presented in sequence, the various operations may be performed in various repetitions, concurrently (in parallel, for example, using threads and/or distributed computing system 132), and/or in other orders than those that are illustrated. For example, a user may execute training application 122, which causes presentation of a first user interface window, which may include a plurality of menus and selectors such as drop-down menus, buttons, text boxes, hyperlinks, etc. associated with training application 122 as understood by a person of skill in the art. The plurality of menus and selectors may be accessed in various orders. An indicator may indicate one or more user selections from a user interface, one or more data entries input into a data field of the user interface, one or more data items read from computer-readable medium 108 or otherwise defined with one or more default values, etc. that are received as an input by training application 122.

In an operation 200, a first indicator may be received that indicates training dataset 124. For example, the first indicator indicates a location and a name of training dataset 124. As an example, the first indicator may be received by training application 122 after selection from a user interface window or after entry by a user into a user interface window. In an alternative embodiment, training dataset 124 may not be selectable. For example, a most recently created dataset may be used automatically. Training dataset 124 includes a number of observation vectors N.

In an operation 202, a second indicator may be received that indicates a plurality of variables or features to include in training a predictive model using training dataset 124. For example, the second indicator may indicate a plurality of column numbers or a plurality of column names. As another option, all of the columns may be used by default. Each observation vector $x_i$, i=1, . . . , m read from training dataset 124 may include a value for each variable of the plurality of variables to define m dimensions or features. Training dataset 124 includes a set of observation vectors $X=[x_{j,i}]$, i=1, . . . , m, j=1, . . . , N. When a value for a variable of the plurality of variables is missing, the observation vector may not be included in the number of observation vectors N, a value may be computed for the missing variable, for example, based on neighbor values, etc.

In an operation 204, a third indicator indicates a model type. For example, the third indicator indicates a name of a model type that performs prediction and/or classification. The third indicator may be received by training application 122 from a user interface window or after entry by a user into a user interface window. A default value for the model type may further be stored, for example, in computer-readable medium 108. As an example, a model type may be selected from "SVM", "K-Cluster", "Neural Network", "Logistic Regression", "Forest", "Gradient Boosting", "Decision Tree", "Factorization Machine", etc. The model type indicated by "SVM" may refer to a support vector machine (SVM) model type. The model type indicated by "K-Cluster" may refer to a k-means clustering model type. The model type indicated by "Neural Network" may refer to a neural network model type. The model type indicated by "Logistic Regression" may refer to a logistic regression model type. The model type indicated by "Forest" may refer to a random forest model type. The model type indicated by "Gradient Boosting" may refer to a gradient boosting model type. The model type indicated by "Decision Tree" may refer to a decision tree model type. The model type indicated by "Factorization Machine" may refer to a factorization machine model type. For example, a default model type may be indicated by "Gradient Boosting". Of course, the model type may be labeled or selected in a variety of different manners by the user as understood by a person of skill in the art. In an alternative embodiment, the model type may not be selectable, and a single model type is implemented by training application 122. For example, the model type indicated as "Gradient Boosting" may be used by default or without allowing a selection.

In an operation 206, a fourth indicator of one or more hyperparameters to use for training and validating the indicated model type and/or specified values for an automatic tuning method (autotune option) are received. Hyperparameters define values or various options that govern a training process based on the model type. The default values of these hyperparameters may not be suitable for all applications. To reduce the effort in adjusting these hyperparameters, an automatic tuning process may be used to identify the best settings for the hyperparameters though the hyperparameters may optionally be selected as an input option by a user.

In an operation 208, a model is trained using each observation vector read from training dataset 124 indicated in operation 200 based on the model type indicated in operation 204, the hyperparameters indicated in operation 206, and the input variables (features) indicated in operation 202. For example, the model may be trained and validated using another application that is distinct from training application 122 or is integrated with training application 122. Training application 122 performs operations associated with defining model description data 126. For illustration, a TREESPLIT Procedure included in SAS® Visual Data Mining and Machine Learning 8.1: Statistical Procedures developed and provided by SAS Institute Inc. of Cary, N.C., USA may be used for a decision tree model type; a FACTMAC procedure included in SAS® Visual Data Mining and Machine Learning 8.1: Data Mining and Machine Learning Procedures developed and provided by SAS Institute Inc. of Cary, N.C., USA may be used for a factorization machine model type; a FOREST procedure included in SAS® Visual Data Mining and Machine Learning 8.1: Data Mining and Machine Learning Procedures developed and provided by SAS Institute Inc. of Cary, N.C., USA may be used for a random forest model type; a GRADBOOST procedure included in SAS® Visual Data Mining and Machine Learning 8.1: Data Mining and Machine Learning Procedures developed and provided by SAS Institute Inc. of Cary, N.C., USA may be used for a gradient boosting model type; a NNET procedure included in SAS® Visual Data Mining and Machine Learning 8.1: Data Mining and Machine Learning Procedures developed and provided by SAS Institute Inc. of Cary, N.C., USA may be used for a gradient boosting model type; a SVMACHINE procedure included in SAS® Visual Data Mining and Machine Learning 8.1: Data Mining and Machine Learning Procedures developed and provided by SAS Institute Inc. of Cary, N.C., USA may be used for a support vector machine model type; a HPLOGISTIC procedure included in SAS/STAT® 15.1 developed and provided by SAS Institute Inc. of Cary, N.C., USA may be used for a logistic regression model type; a KCLUS procedure included in SAS® Visual Data Mining and Machine Learning 8.1: Statistical Procedures developed and provided by SAS Institute Inc. of Cary, N.C., USA may be used for a k-means clustering model type; etc.

In an operation 210, the data that describes the trained model is stored in model description data 126. For illustration, the trained model may be stored using the ASTORE procedure provided by SAS® Visual Data Mining and Machine Learning software.

Feature contribution application 128 performs operations associated with computing a feature contribution value for each variable to a predicted result computed using the trained model. Feature contribution application 128 repeatedly modifies observation vectors selected from training dataset 124 (or another dataset) and scores the modified observation vectors with the trained predictive model to compute Shapley estimate values. Some or all of the operations described herein may be embodied in feature contribution application 128. The operations may be implemented using hardware, firmware, software, or any combination of these methods.

Referring to the example embodiment of FIG. 1, feature contribution application 128 is implemented in software (comprised of computer-readable and/or computer-executable instructions) stored in computer-readable medium 108 and accessible by processor 110 for execution of the instructions that embody the operations of feature contribution application 128. Feature contribution application 128 may be written using one or more programming languages, assembly languages, scripting languages, etc. Feature contribution application 128 may be implemented as a Web application.

Feature contribution application 128 may be integrated with other analytic tools. As an example, feature contribution application 128 may be part of an integrated data analytics software application and/or software architecture such as that offered by SAS Institute Inc. of Cary, N.C., USA. For example, feature contribution application 128 may be part of SAS® Enterprise Miner™ developed and provided by SAS Institute Inc. of Cary, N.C., USA that may be used to create highly accurate predictive and descriptive models based on analysis of vast amounts of data from across an enterprise. Merely for further illustration, feature contribution application 128 may be implemented using or integrated with one or more SAS software tools such as Base SAS, SAS/STAT®, SAS® High Performance Analytics Server, SAS® LASR™, SAS® In-Database Products, SAS/OR®, SAS/ETS®, SAS® Visual Analytics, SAS® Viya™, SAS In-Memory Statistics for Hadoop®, etc., all of which are developed and provided by SAS Institute Inc. of Cary, N.C., USA. One or more operations of feature contribution application 128 further may be performed by an ESPE. Training application 122 and feature contribution application 128 further may be integrated applications. As another alternative, training application 122 and feature contribution application 128 may not be integrated applications and may be executed on different computing devices.

Figure 3A:
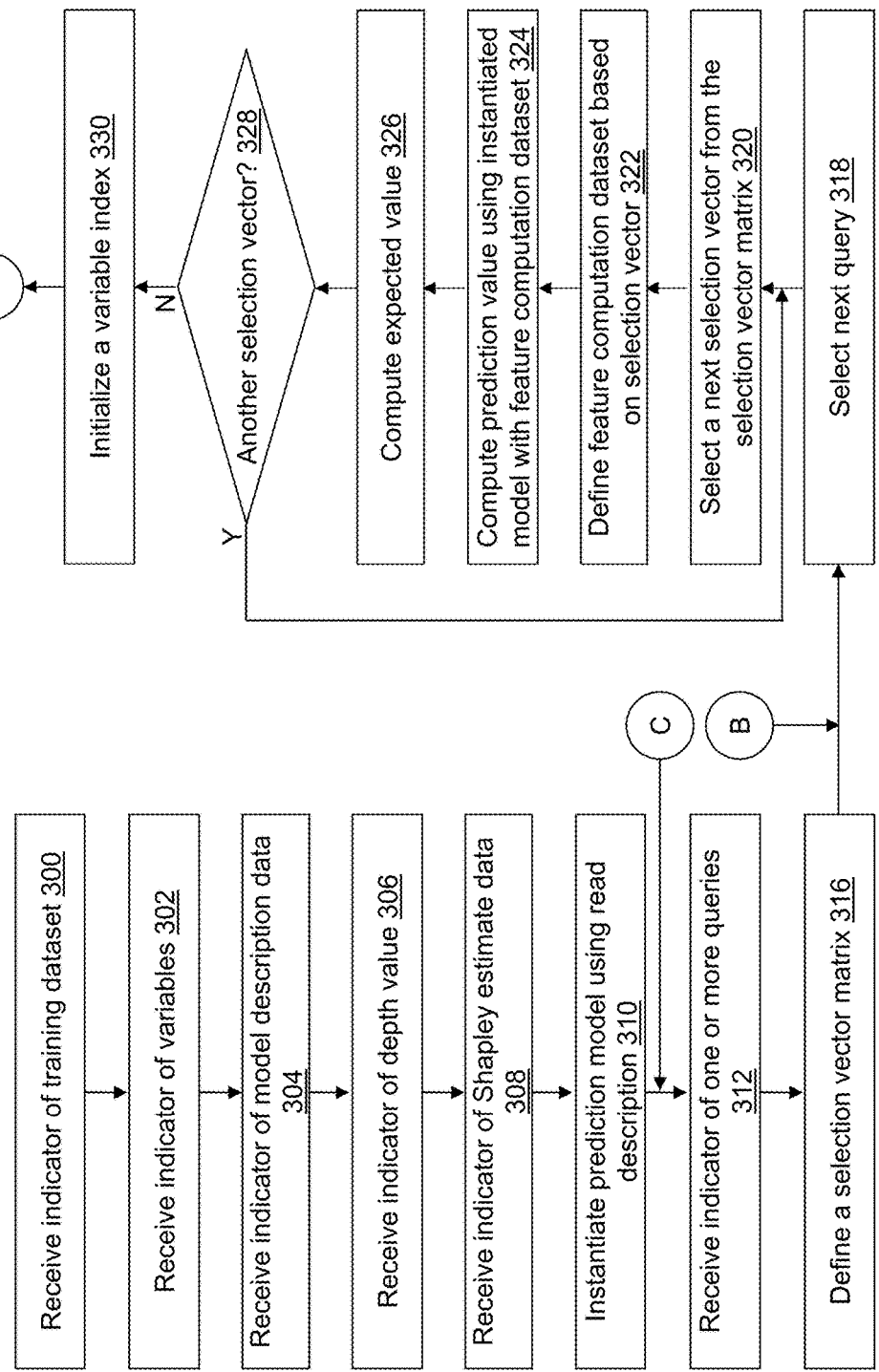
FIGS. 3A and 3B depict a flow diagram illustrating examples of operations performed by a feature generation application of the feature contribution device of FIG. 1 in computing a contribution of each feature to a predictive result in accordance with an illustrative embodiment.
Figure 3B:
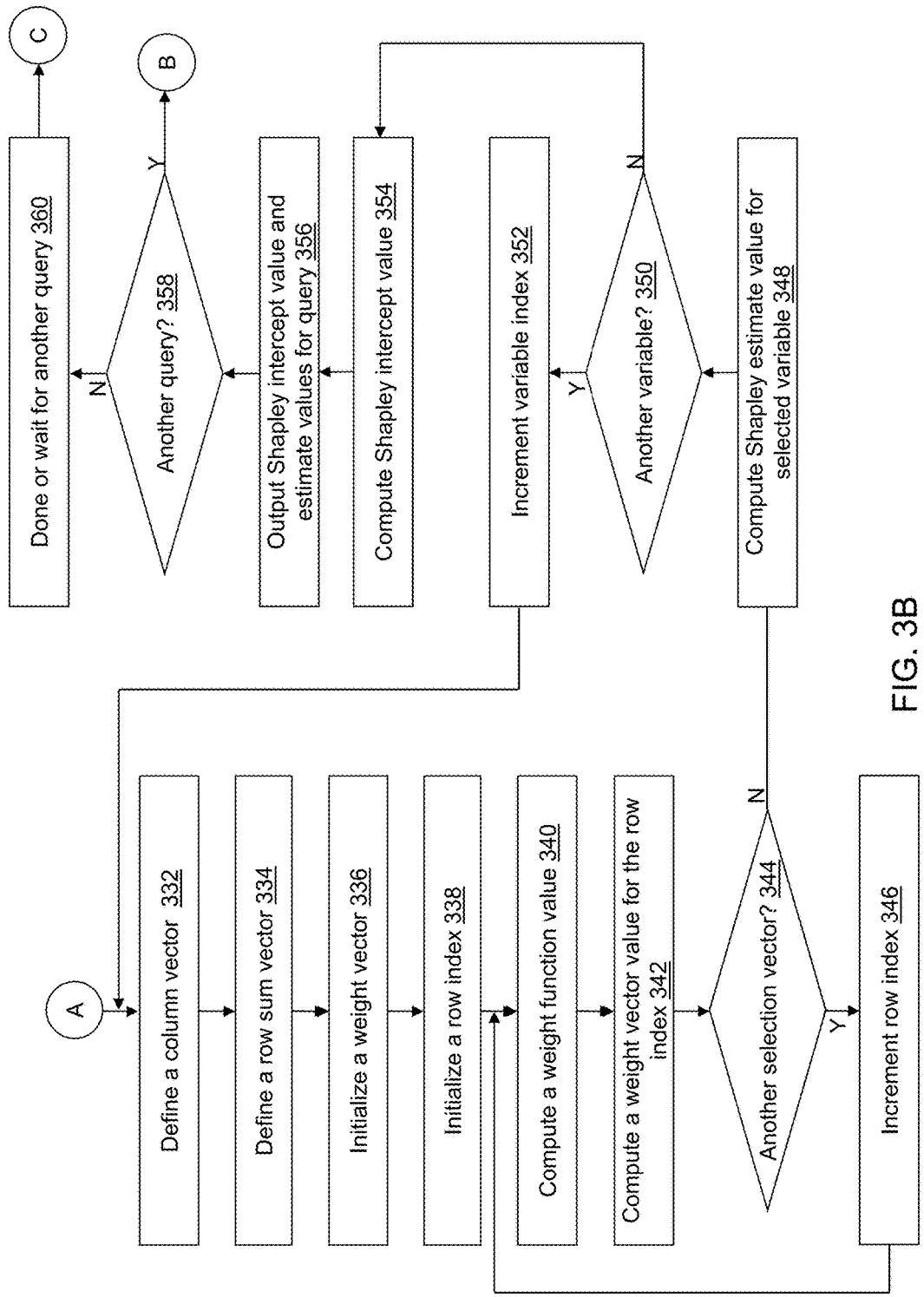

Referring to FIGS. 3A, 3B, 4, and 5, example operations of feature contribution application 128 are described. Additional, fewer, or different operations may be performed depending on the embodiment of feature contribution application 128. The order of presentation of the operations of FIGS. 3A, 3B, 4, and 5 is not intended to be limiting. Although some of the operational flows are presented in sequence, the various operations may be performed in various repetitions, concurrently (in parallel, for example, using threads and/or a distributed computing system), and/or in other orders than those that are illustrated. Referring to FIGS. 3A and 3B, example operations of a first variant of feature contribution application 128 are described.

Similar to operation 200, in an operation 300, the first indicator may be received that indicates training dataset 124.

Similar to operation 202, in an operation 302, the second indicator may be received that indicates the plurality of variables to include in the feature generation process using training dataset 124. The plurality of variables to include in the feature generation process are the same plurality of variables to include in training the model in operation 208.

In an operation 304, a fifth indicator may be received that indicates model description data 126. For example, the fifth indicator indicates a location and a name of model description data 126. As an example, the fifth indicator may be received by feature contribution application 128 after selection from a user interface window or after entry by a user into a user interface window. In an alternative embodiment, model description data 126 may not be selectable. For example, model description data 126 may be retrieved from a predefined location.

In an operation 306, a sixth indicator of a depth value $\chi$ may be received. Depth value $\chi$ defines a number of elements in a selection vector that are allowed to be different than either a full cardinality selection vector defined with all ones or a zero cardinality vector defined with all zeroes as described further below. In an alternative embodiment, the sixth indicator may not be received. For example, a default value may be stored, for example, in computer-readable medium 108 and used automatically. In another alternative embodiment, the depth value $\chi$ may not be selectable. Instead, a fixed, predefined value may be used or a value may be computed automatically. For illustration, a default value of the depth value $\chi$ may be selected based on a number of the plurality of variables m indicated in operation 302. For example, $1 \leq \chi \leq 0.5$ m.

In an operation 308, a seventh indicator may be received that indicates Shapley estimate data 130. For example, the seventh indicator indicates a location and a name of Shapley estimate data 130. As an example, the seventh indicator may be received by feature contribution application 128 after selection from a user interface window or after entry by a user into a user interface window. In an alternative embodiment, Shapley estimate data 130 may not be selectable. For example, Shapley estimate data 130 may be stored to a predefined location or automatically presented on display 116. When feature contribution application 128 is implemented using an ESPE, the Shapley estimate data may be streamed to one or more computing device of distributed computing system 132 that subscribes to the Shapley estimate data.

In an operation 310, a predictive model is instantiated from the data read from model description data 126 that describes the trained model. For example, the function that describes the trained model may be generally referenced as $f(\cdot)$.

Figure 6:
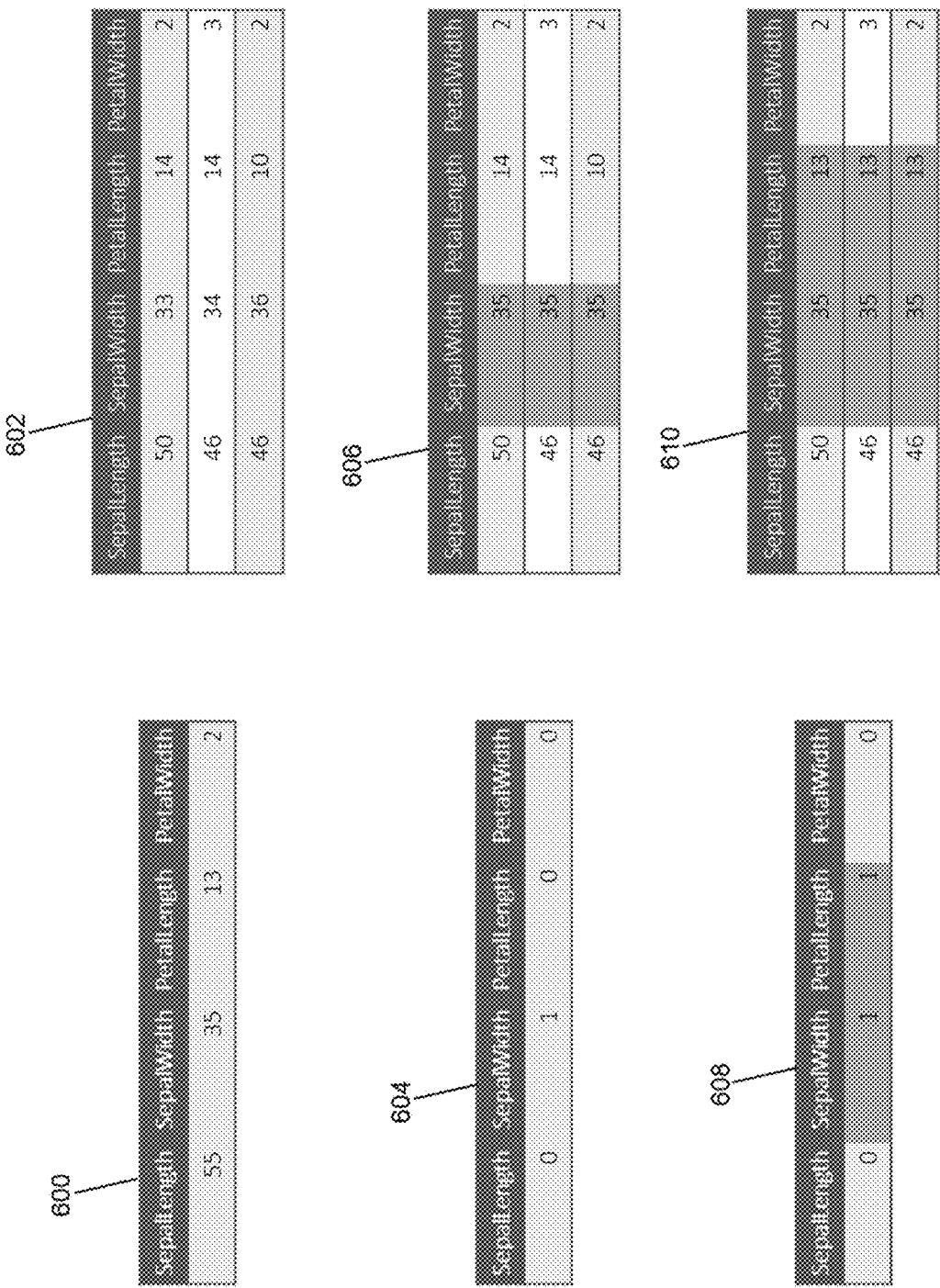
FIG. 6 graphically depicts a feature computation dataset definition process performed by the feature generation application of the feature contribution device of FIG. 1 in accordance with an illustrative embodiment.

In an operation 312, an eighth indicator of one or more query vectors may be received. For example, referring to FIG. 6, a query vector 600 is received that indicates values for variables (features) for which a contribution to a computed result is requested. In the illustrative embodiment, a single query vector q is received. Each query vector q may be stored as an m dimensional array. In alternative embodiments, a plurality of query vectors may be received to define a query matrix Q where each row of the query matrix Q defines a query vector such that $Q(i,j)=q_j$, $j=1, \ldots, m$, $i=1, \ldots, N_q$, where $N_q$ is a number of the one or more query vectors. For example, the one or more query vectors may be received through input interface 102 or through communication interface 106 or read from computer-readable medium 108. When feature contribution application 128 is implemented using an ESPE, the one or more query vectors may be read from an event block object streamed to feature contribution device 100 from a computing device of distributed computing system 132.

Referring again to FIG. 3A, in an operation 316, a selection vector matrix Z is defined based on the depth value $\chi$, for example, based on the following pseudo code:

for k=0, ..., $\chi$, m-$\chi$, ..., m do

Let $$Z^k \in \{0, 1\}^{\binom{m}{k} \times m}$$

be the selection matrix whose rows form the set $\{z \in \{0,1\}^m : |z| = k\}$ $$Z = \begin{bmatrix} Z \\ Z^k \end{bmatrix}$$

end for
where Z is initialized as an empty matrix. $\chi$ has a practical upper limit of m/2 rounded up because, for $\chi$ greater than or equal to that number, all possible selection vectors would be included.

Again, feature contribution application 128 repeatedly modifies observation vectors selected from training dataset 124 and computes predicted results for each modified observation vector using the instantiated predictive model. Modification of the observation vectors from training dataset 124 is controlled based on a selection vector z selected from selection vector matrix Z. As illustrated above, selection vector matrix Z may be defined using a binary notation system $z \in [0,1]^m$. In the illustrative embodiment, the binary notation includes a zero value and a one value. In alternative equivalent embodiments, the binary notation may include two different values other than the zero value and the one value. Each selection vector z of selection vector matrix Z may be stored as an m dimensional array of ones and zeroes. Selection vector matrix Z may be stored as a two-dimensional matrix of dimension c×m, where c is a number of selection vectors of selection vector matrix Z.

For illustration, an IRIS dataset was used to train a predictive model to predict a species of iris for a given flower based upon information about a sepal length, a sepal width, a petal length, and a petal width of the flower with a goal of explaining how the model determines a probability for choosing the species as "Setosa". Referring again to FIG. 6, three rows of the IRIS dataset are shown in an initial training dataset 602. When generating the modified data, training dataset 124 is copied, and one or more columns of each observation vector are replaced with a value extracted from query vector q. The variable values to be replaced with a respective query value are represented by a one, and unchanged variable values are represented by a zero. The ones and zeroes are arranged in the order that their respective variable is defined in each observation vector. A first selection vector 604 can be defined as z=[0,1,0,0]. A first feature computation dataset 606 is shown that is a modification of initial training dataset 602 with the "SepalWidth" variable value of each observation vector replaced with the value of 35 extracted from the query vector 600 because the only one in first selection vector 604 is a second entry associated with a second variable. A first feature computation dataset 606 is shown that is a modification of initial training dataset 602 with the "SepalWidth" variable value of each observation vector replaced with the value of 35 extracted from the query vector 600 because the only one in first selection vector 604 is a second entry associated with the second variable that is the "SepalWidth" variable.

A second selection vector 608 can be defined as z=[0,1,1,0]. A second feature computation dataset 610 is shown that is a modification of initial training dataset 602 with the "SepalWidth" variable value and the "PetalLength" variable value of each observation vector replaced with the values of 35 and 13, respectively, extracted from the query vector 600 because the ones in first selection vector 604 are the second entry associated with a second variable and a third entry associated with a third variable. Again, the values in z refer to the variables in order, and each selection vector describes creation of a feature computation dataset by defining the columns that are replaced and the columns that are not replaced.

Figure 7:
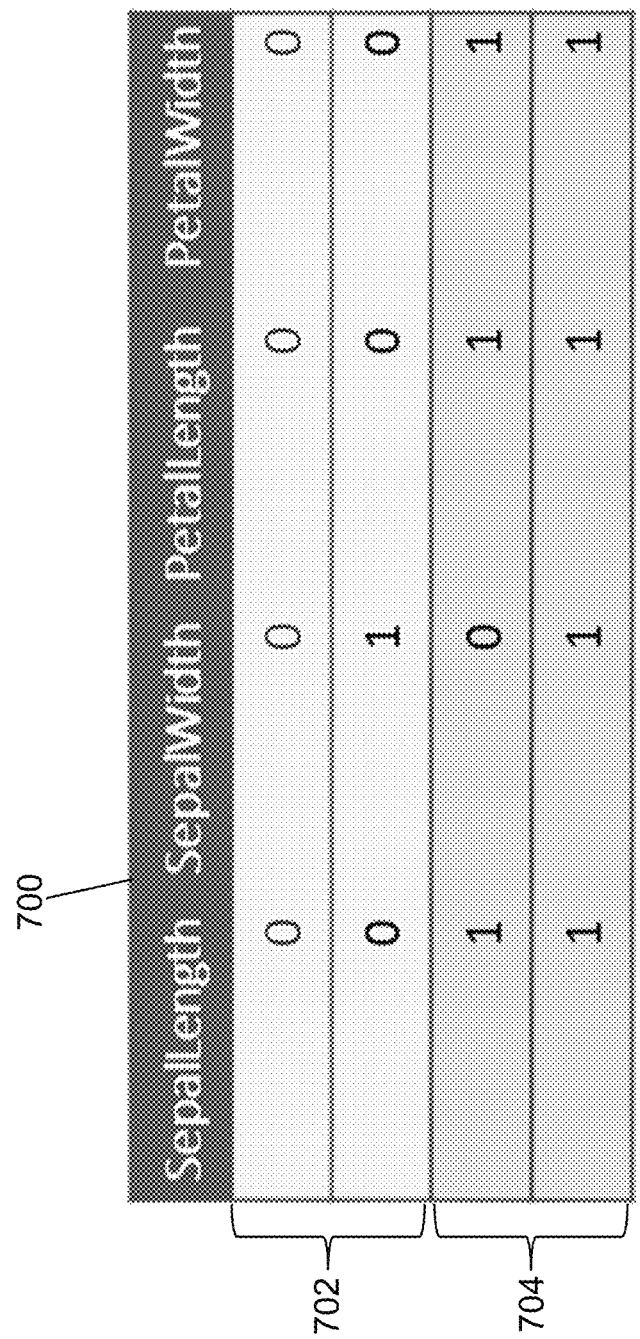
FIG. 7 depicts a subset of a selection vector matrix for a "SepalWidth" variable defined by the feature generation application of the feature contribution device of FIG. 1 for a depth value equal to one in accordance with an illustrative embodiment.

A full Shapley computation requires a calculation for every possible selection vector, where a number of possible selection vectors is 2 m. For example, a full selection vector matrix for four variables results in 16 selection vectors, a full selection vector matrix for five variables results in 32 selection vectors, a full selection vector matrix for six variables results in 64 selection vectors, etc. Operation 316 reduces the number of selection vectors c of selection vector matrix Z by only using those that satisfy a certain cardinality threshold based on the depth value. The cardinality of a selection vector z is a number of ones that it contains. A "full cardinality" selection vector is a vector of all ones. Conversely, a "zero cardinality" selection vector is a vector of all zeroes. For example, for $\chi=1$, the only selection vectors allowed are the zero cardinality vector, the full cardinality vector, any selection vector with only a single one, and any selection vector with only a single zero. For illustration, for $\chi=1$, and to evaluate the variable indicated as "SepalWidth", a first subset selection vector matrix 700 shown referring to FIG. 7 includes the zero cardinality vector, the full cardinality vector, the selection vector with a one for only the "SepalWidth" variable value, and the selection vector with a zero for only the "SepalWidth" variable value. A first two rows form a first pair 702 where one row is full of zeros and the other is full of zeros everywhere except under the "SepalWidth" variable column. A last two rows form a second pair 704 where one row is full of ones and the other is full of ones everywhere except under the "SepalWidth" variable column.

Referring to FIG. 8, a first selection vector matrix 800 is defined in operation 316 for $\chi=1$ and m=6 and includes a zero cardinality vector 802, a full cardinality vector 804, a first set 806 that includes a single one, where the single one is included for each of the six variables, and a second set 808 that includes a single zero, where the single one is included for each of the six variables.

Figure 9:
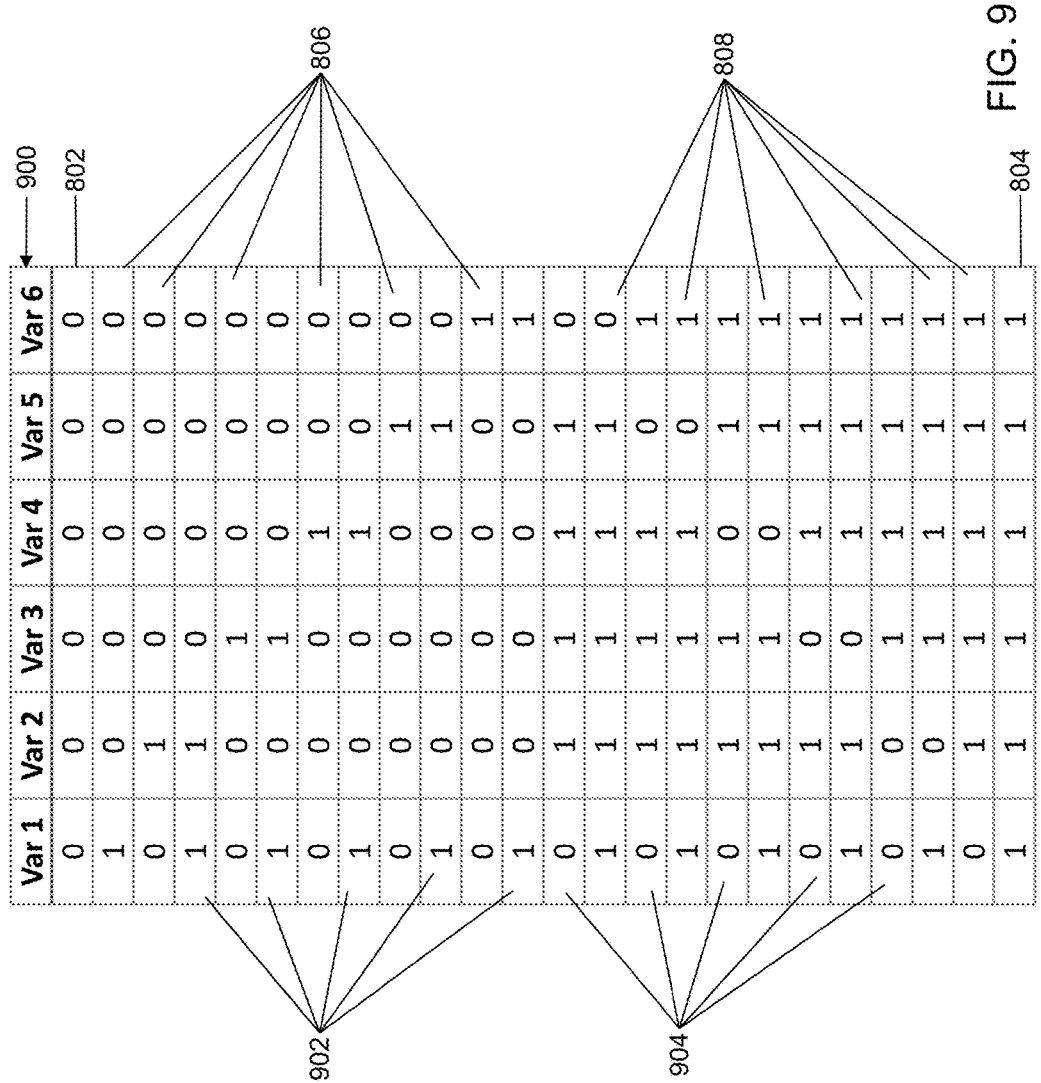
FIG. 9 depicts a subset of a selection vector matrix defined by the feature generation application of the feature contribution device of FIG. 1 for the depth value equal to two with six variables in accordance with an illustrative embodiment.

As the depth value $\chi$ increases, a total number of selection vectors used increases. Referring to FIG. 9, a second subset selection vector matrix 900 is defined for $\chi=2$ and m=6 and includes zero cardinality vector 802, full cardinality vector 804, first set 806, second set 808, a third set 902 that includes only pairs of ones with the first variable "Var 1" being one of the pair of ones, and a fourth set 904 that includes only pairs of two zeroes with the first variable "Var 1" being one of the pair of ones. Due to length, second subset selection vector matrix 900 only includes the pairs associated with the first variable "Var 1". A second selection vector matrix defined for $\chi=2$ and m=6 in operation 316 also includes a row for each other pair of variables (e.g., "Var 2" paired with "Var 3", "Var 2" paired with "Var 4", "Var 3" paired with "Var 4", etc.) with zeros and ones that are not already included in the second selection vector matrix. Instead of the 24 rows shown, the second selection vector matrix defined for $\chi=2$ and m=6 in operation 316 has 44 rows.

To summarize, a process of defining the selection vector matrix includes:
  adding a zero cardinality vector that includes a zero value for each variable of the plurality of variables to the selection vector matrix;
  adding a full cardinality vector that includes a one value for each variable of the plurality of variables to the selection vector matrix; and for a group size value that is successively each value of the depth value that is greater than zero and less than or equal to the depth value $\chi$, adding a plurality of selection vectors to the selection vector matrix that each have the one value for a group of variables of the plurality of variables and the zero value for each remaining variable of the plurality of variables not included in the group of variables, wherein a size of the group of variables is the group size value; and adding a plurality of selection vectors to the selection vector matrix that each have the zero value for the group of variables of the plurality of variables and the one value for each remaining variable of the plurality of variables not included in the group of variables.

Only unique selection vectors are added to the selection vector matrix.

Merely for illustration, the code snippet below may be used to define the selection vector matrix. Of course, other implementations and languages may be used in alternative embodiments based on the description above.

```
card_vector = do(0,depth,1) || (input_count - do(depth,0,-1));
card_vector = unique(card_vector);
combinations =
comb(j(ncol(card_vector),1,input_count),colvec(card_vector));
selection_matrix = j(sum(combinations),input_count,0);
/* Loop Through Cardinalities/Combinations */
i = 1;
do j = 1 to ncol(card_vector);
  cardinality = card_vector[j];
  /*All 0 Row */
  if cardinality = 0 then i = i + 1;
  /* Some 1 Row */
  else do;
    /* Locations of 1s in Row */
    selection_locs = allcomb(input_count,cardinality);
    do k = 1 to nrow(selection_locs);
      selection_matrix[i,selection_locs[k]] = 1;
      i = i + 1;
    end;
  end;
end;
```

In an operation 318, a next query vector q is selected from the one or more queries. For example, on a first iteration of operation 318, a first query $q_1$ is selected as the next query; on a second iteration of operation 318, a second query $q_2$ is selected as the next query, and so on until each query of the one or more queries is processed.

In an operation 320, a next selection vector z is selected from the defined selection vector matrix. For example, on a first iteration of operation 320, a first selection vector is selected as the next selection vector from a first row of the defined selection vector matrix. On a second iteration of operation 320, a second selection vector is selected as the next selection vector from a second row of the defined selection vector matrix, and so on for each iteration based on the number of selection vectors c included in the defined selection vector matrix.

In an operation 322, a feature computation dataset is defined based on the selected next selection vector. A copy of the training dataset 124 denoted $X^t$ is stored in a feature computation dataset $X^z$, and only the variable values for which the selection vector includes a one value are replaced with a corresponding value defined in the selected next query vector q. For example, the following pseudo code defines a feature computation dataset based on the selected next selection vector z:

$X^z = X^t$
for i=1, 2, . . . , m do
  if $z_i = 1$ then
    $X_{[:,i]}^z = q_i 1_{N \times 1}$
  end if
end for where $X^t$ is an array of the observation vectors stored in training dataset 124, and $X^z$ is the feature computation dataset defined for next selection vector z, and N is the number of observation vectors included in training dataset 124, and $1_{N \times 1}$ is an all one vector.

In an operation 324, a prediction value vector y is computed for each observation vector included in the feature computation dataset using the instantiated predictive model. For example, $y_t = f(X_{[t,:]}^z)$, t=1, . . . , N.

In an operation 326, an expected value is computed for the selection vector indicated in operation 320 from the prediction values computed for each observation vector included in the feature computation dataset to define an expected value vector $\mu$ of dimension c. The expected value of the selection vector indicated in operation 320 is an average of the predicted results computed for the observation vectors included in the feature computation dataset. This average is the expected prediction of the model given the selection vector. For example, $$\mu_j = \frac{1}{N} 1_{N \times 1}^T y, \ j = 1, \ldots C,$$

where $1_{N \times 1}^T$ is a transpose of the all one vector.

In an operation 328, a determination is made concerning whether or not the defined selection vector matrix Z includes another selection vector. When the defined selection vector matrix includes another selection vector, processing continues in operation 320 to select and process a next selection vector. When the defined selection vector matrix does not include another selection vector, processing continues in an operation 330.

In operation 330, a variable index i is initialized, for example, as i=1.

Referring to FIG. 3B, in an operation 332, a column vector a is defined having dimension c, for example, using $a = Z_{[:,i]} \in \{0,1\}^c$, the $i^{th}$ column of the defined selection vector matrix Z.

In an operation 334, a row sum vector b is defined for a given value i having dimension c, for example, using $b = Z_{[:,j \neq i]} 1_{(m-1) \times 1} \in \mathbb{N}^{c \times 1}$, the row sum of the defined selection vector matrix Z excluding the $i^{th}$ column.

In an operation 336, a weight function vector v is initialized having dimension c, for example, using $v = 0_{c \times 1}$, where $0_{c \times 1}$ is an all zero vector.

In an operation 338, a row index j is initialized, for example, as j=1.

In an operation 340, a weight function value is computed, for example, using $$\omega_\chi(b_j) = \begin{cases} \dfrac{b_j!(m-b_j-1)!}{m!} \cdot \dfrac{m}{2\chi}, & \text{if } \chi < \lceil m/2 \rceil \\ \dfrac{b_j!(m-b_j-1)!}{m!}, & \text{otherwise} \end{cases}$$

In an operation 342, a weight vector value is computed for the row index j, for example, using $$v_j = \begin{cases} (2a_j-1)\omega_\chi(b_j), & \text{if } b_j \leq \chi-1 \text{ or } b_j \geq m-\chi \\ 0, & \text{otherwise} \end{cases}$$

In an operation 344, a determination is made concerning whether or not the defined selection vector matrix includes another selection vector. When the defined selection vector matrix includes another selection vector, processing continues in an operation 346. When the defined selection vector matrix does not include another selection vector, processing continues in an operation 348. For example, j<c when the defined selection vector matrix includes another selection vector.

In operation 346, the row index j is incremented, for example, using j=j+1, and processing continues in operation 340.

In operation 348, a Shapley estimate value $\phi_i$ is computed for the variable of the plurality of variables associated with the variable index i, for example, using $\phi_i = v^T \mu$, where v is the weight vector, and $\mu$ is the expected value for the variable of the plurality of variables associated with the variable index i. For example, the variable index i may be used as an index to a Shapley estimate vector $\phi$ though other data structures may be used in alternative embodiments. A positive Shapley value for a variable indicates that the variable contributed to the prediction value; whereas, a negative Shapley value for a variable indicates that the variable detracts from the prediction value. Based on negative versus positive values as well as a relative magnitude comparison, an influence of the variables can be explained.

In an operation 350, a determination is made concerning whether or not the plurality of variables includes another variable. When the plurality of variables includes another variable, processing continues in an operation 352. When the plurality of variables does not include another variable, processing continues in an operation 354. For example, i<m when the plurality of variables includes another variable.

In operation 352, the variable index i is incremented, for example, using i=i+1, and processing continues in operation 332.

In operation 354, a Shapley intercept value $\phi_0$ is computed for the query. For example, $$\phi_0 = f(q) - \sum_{i=1}^{m} \phi_i,$$

where f(q) is the prediction value computed for the variable values defined in the query using the instantiated predictive model. The Shapley intercept value $\phi_0$ indicates the average prediction from the model.

In an operation 356, the Shapley intercept value $\phi_0$ and the Shapley estimate vector $\phi$ are output for each query, for example, by storing the values to Shapley estimate data 130, presenting the values on display 116, printing the values on printer 120, sending a message indicating the values using communication interface 106 to another computing device of distributed computing system 132, etc. The prediction value f(q) and/or the query may further be output in combination with the Shapley intercept value $\phi_0$ and the Shapley estimate vector $\phi$ or separate from the Shapley intercept value $\phi_0$ and the Shapley estimate vector $\phi$. The Shapley intercept value $\phi_0$ and the Shapley estimate vector are used to explain how a model scores a query by attributing a portion of the predicted value to each variable, which allows the user of the predictive model to understand and interpret the predictive model based on how the input variables of the model affect the target variable. Thus, the Shapley values explain to a user how the variables contribute to the model's prediction of the query, and also indicate the variables that have the most influence on the model's prediction of the query.

In an operation 358, a determination is made concerning whether or not the one or more queries includes another query. When the one or more queries includes another query, processing continues in operation 318 to select and process the next query. When the one or more queries does not include another query, processing continues in an operation 360.

In operation 360, processing is either done or continues in operation 312 to await receipt of another one or more queries.

Figure 4:
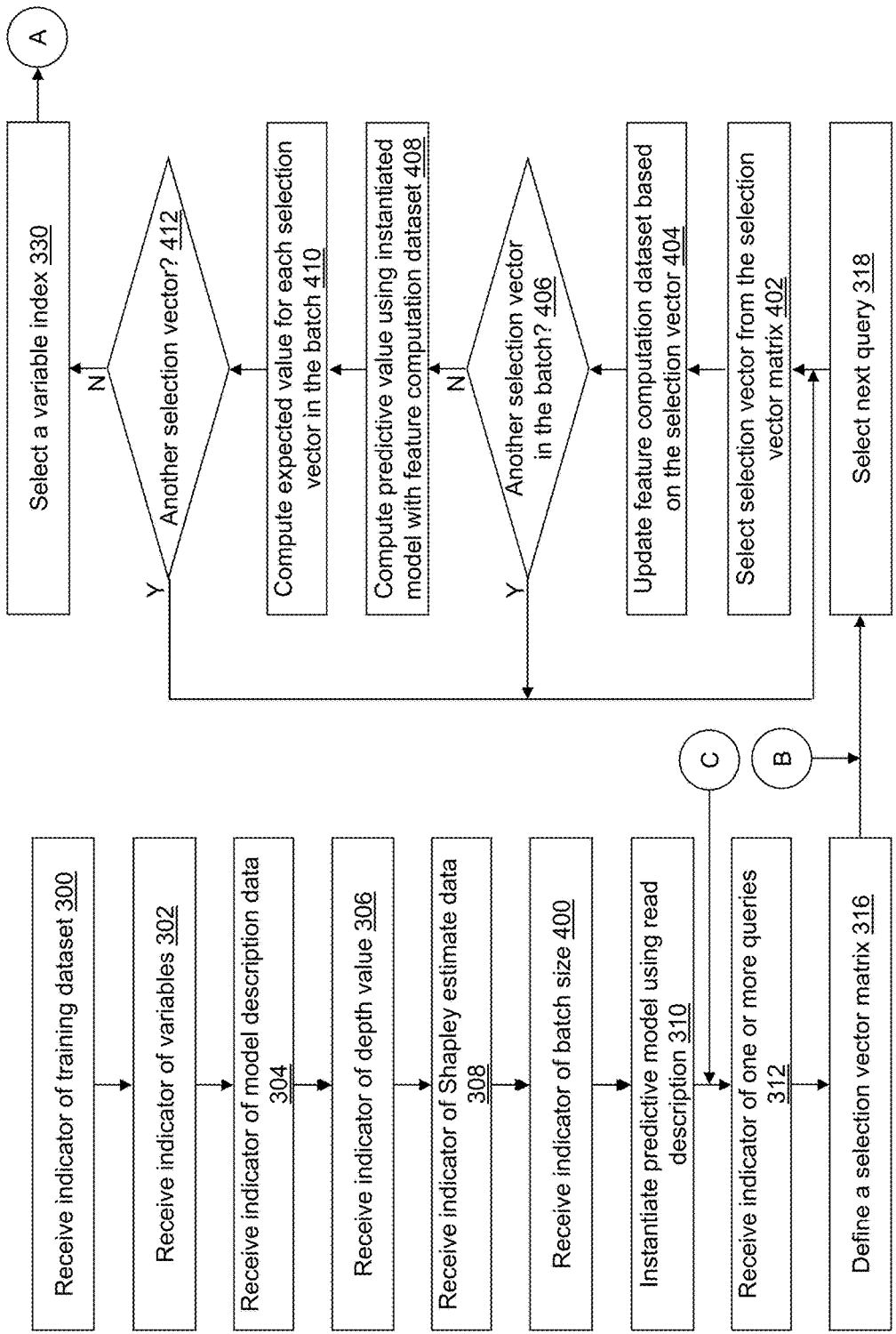
FIG. 4 depicts a flow diagram illustrating examples of operations performed by the feature generation application of the feature contribution device of FIG. 1 in computing the contribution of each feature to the predictive result in accordance with an alternative embodiment.

Referring to FIG. 4, example operations associated with a second variant of feature contribution application 128 are described. When implementing the second variant of feature contribution application 128, an execution speed can be increased relative to the described operations of the first variant of feature contribution application 128 by calculating more than one selection vector's expected value in a single scoring operation by increasing a size of the feature computation dataset to include the additional selection vector's modified observation vectors. The second variant of feature contribution application 128 similarly includes operations 300, 302, 304, 306, and 308.

In an operation 400, an eighth indicator of a batch size $n_b$ may be received. Batch size $n_b$ defines a number of selection vectors in each batch of Shapley expected values to perform together. In an alternative embodiment, the eighth indicator may not be received. For example, a default value may be stored, for example, in computer-readable medium 108 and used automatically. In another alternative embodiment, the batch size $n_b$ may not be selectable. Instead, a fixed, predefined value may be used or a value may be computed automatically. For illustration, a value of the batch size $n_b$ may be selected based on an available memory of feature contribution device 100, a size of training dataset 124, limitations of the trained predictive model, etc.

The second variant of feature contribution application 128 similarly includes operations 310, 312, 316, and 318.

Similar to operation 320, in an operation 402, a next selection vector z is selected from the defined selection vector matrix using, for example, $z = Z_{[(i-1)n_b+j,:]}$, which is a $j^{th}$ row of an $i^{th}$ batch in Z. For example, on a first iteration of operation 320, a first selection vector is selected as the next selection vector from a first row of the defined selection vector matrix. On a second iteration of operation 320, a second selection vector is selected as the next selection vector from a second row of the defined selection vector matrix, and so on for each iteration based on the number of selection vectors c included in the defined selection vector matrix.

Similar to operation 322, in an operation 404, a feature computation dataset X is defined based on the selected next selection vector and updated to include in each batch, for example, using $$X = \begin{bmatrix} X \\ X^z \end{bmatrix},$$

where feature computation dataset X was initialized as an empty set before processing each batch.

In an operation 406, a determination is made concerning whether or not there is another selection vector in the batch to process. When there is another selection vector to process, processing continues in operation 402 to select and process a next batch. When there is not another selection vector to process, processing continues in an operation 408.

Similar to operation 324, in an operation 408, a prediction value vector y is computed for each observation vector included in the feature computation dataset using the instantiated predictive model. For example, $y_t = f(X_{[t,:]})$, t=1, ..., $n_b$.

Similar to operation 326, in an operation 410, an expected value is computed for each variable indicated in operation 302 from the prediction values computed for each observation vector included in the feature computation dataset to define an expected value vector μ of dimension c. For example, $$\mu_{[(i-1)n_b+j]} = \frac{1}{N} 1_{N \times 1}^\top y_{[(j-1)N+1:jN]}, j=1, \ldots, n_b.$$

Similar to operation 328, in an operation 412, a determination is made concerning whether or not the defined selection vector matrix Z includes another selection vector. When the defined selection vector matrix includes another selection vector, processing continues in operation 402 to select and process a next selection vector. When the defined selection vector matrix does not include another selection vector, processing continues in operation 330.

The second variant of feature contribution application 128 similarly includes operations 330 and operations 332 to 360 shown referring to FIG. 3B.

Figure 5A:
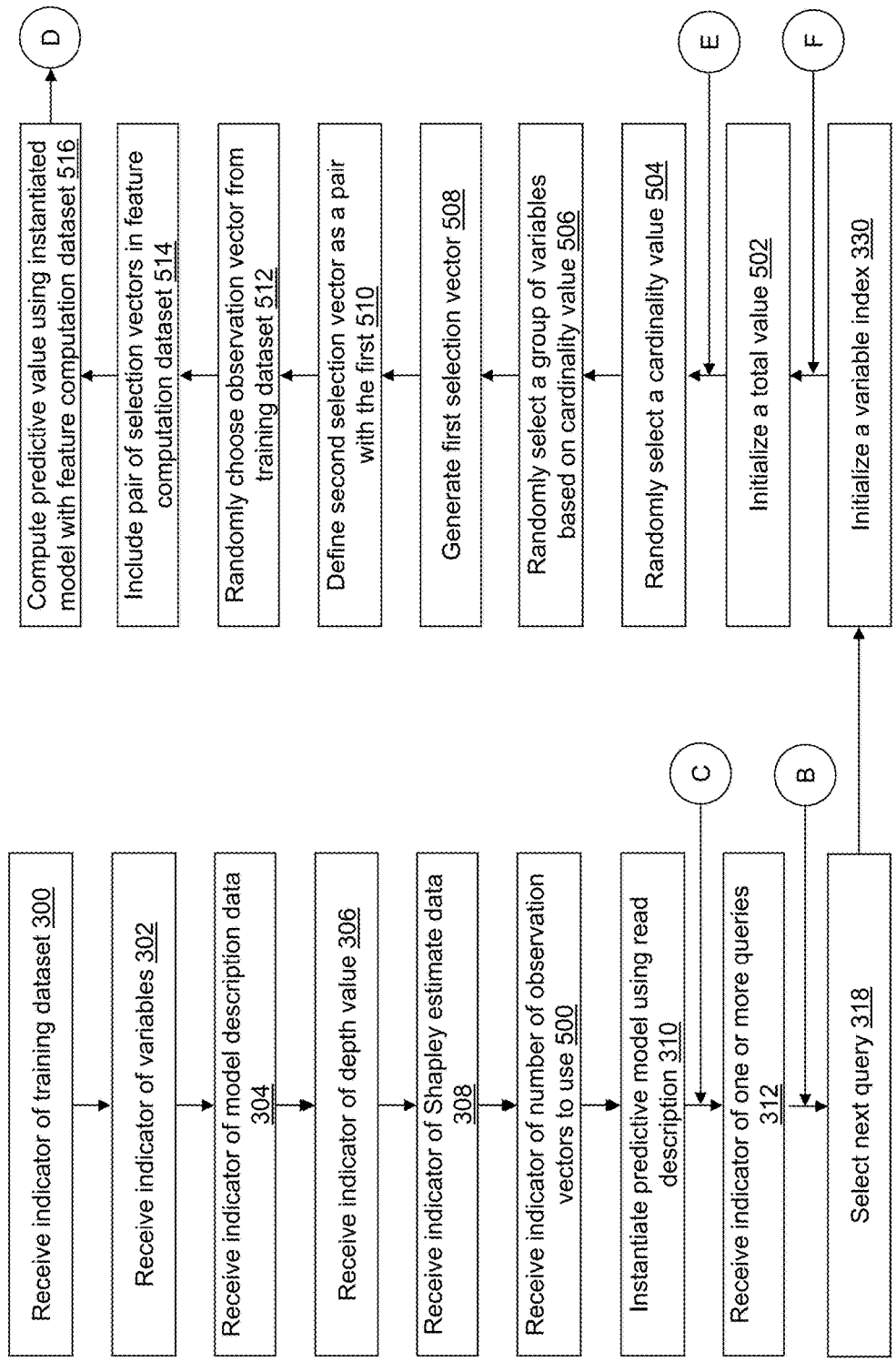
FIGS. 5A and 5B depict a flow diagram illustrating examples of operations performed by the feature generation application of the feature contribution device of FIG. 1 in computing the contribution of each feature to the predictive result in accordance with another alternative embodiment.
Figure 5B:
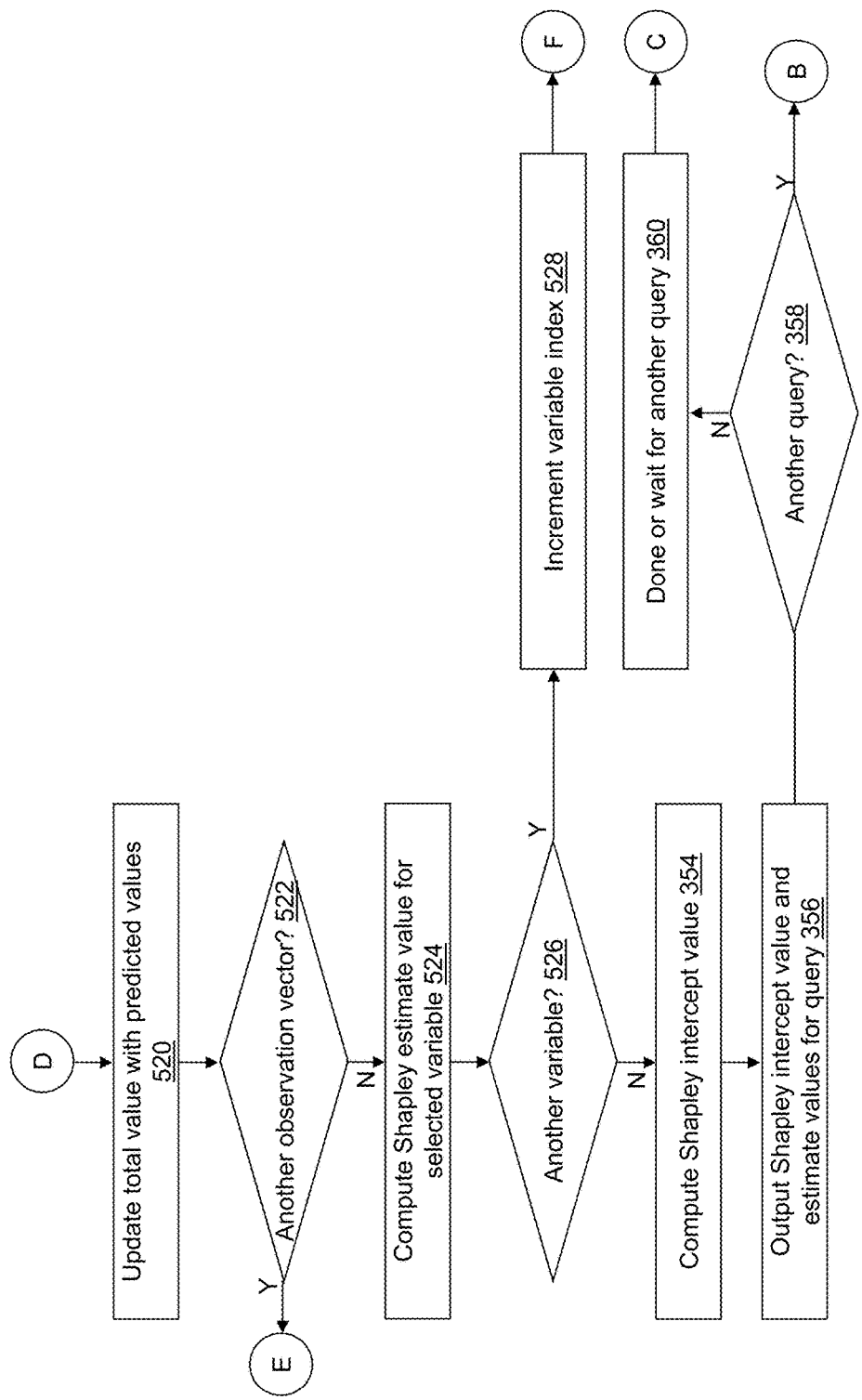

Referring to FIGS. 5A and 5B, example operations associated with a third variant of feature contribution application 128 are described. When implementing the third variant of feature contribution application 128, an execution speed can be increased relative to the described operations of the first variant of feature contribution application 128 or the second variant of feature contribution application 128 by not using all of the observation vectors of training dataset 124. Instead, a predefined number of observation vectors is selected from training dataset 124 using a defined sampling method.

The third variant of feature contribution application 128 similarly includes operations 300, 302, 304, 306, and 308.

In an operation 500, a ninth indicator of a number of observation vectors to use $n_{ov}$ may be received. The number of observation vectors to use $n_{ov}$ defines a number of observation vectors selected from training dataset 124. In an alternative embodiment, the ninth indicator may not be received. For example, a default values may be stored, for example, in computer-readable medium 108 and used automatically. In another alternative embodiment, the number of observation vectors to use $n_{ov}$ may not be selectable. Instead, a fixed, predefined value may be used or a value may be computed automatically. For illustration, a value of the number of observation vectors to use $n_{ov}$ may be selected based on an available memory of feature contribution device 100, a size of training dataset 124, limitations of the trained predictive model, etc.

The third variant of feature contribution application 128 similarly includes operations 310, 312, 318, and 330.

In an operation 502, a total value t is initialized, for example, using t=0.

In an operation 504, a cardinality value $c_v$ is randomly selected from the set of values defined from 0, ..., χ, m−χ, ..., m using a uniform random distribution applied. For example, with m=10 and χ=4, the set from which the cardinality value $c_v$ is randomly selected includes {1, 2, 3, 4, 7, 8, 9, 10}.

In an operation 506, a group of variables is randomly selected from among all of the variable groups that include the current variable of interest indicated by the variable index i in operation 330 and that have the selected cardinality value $c_v$, where the selected cardinality value $c_v$ indicates a number of variables included in the group of variables. For example, combinations of variables may be selected from the plurality of variables where each combination of the combinations of variables includes selected cardinality value $c_v$ number of variables. The group of variables is randomly selected from the combinations of variables that include the current variable of interest.

In an operation 508, a first selection vector $z_1$ is generated based on the selected group of variables. First selection vector $z_1$ includes a one for each variable in the selected group of variables, and a zero for all other variables. For clarity, by construction the $i^{th}$ variable of $z_1$ is 1 because the variable of interest is included in the selected group of variables.

In an operation 510, a second selection vector $z_2$ is defined by replacing the $i^{th}$ variable of $z_1$ of the first selection vector $z_1$ with a zero to define a pair of selection vectors.

In an operation 512, an observation vector is randomly selected from training dataset 124 using a uniform distribution.

In an operation 514, a feature computation dataset X is updated to include only the selected observation vector modified based on first selection vector $z_1$ and the selected observation vector modified based on second selection vector $z_2$, for example, using $$X = \begin{bmatrix} x^{z_1} \\ x^{z_2} \end{bmatrix}.$$

Similar to operation 324, in an operation 516, a first prediction value vector $y_1$ is computed for $x^{z_1}$ and a second prediction value vector $y_2$ is computed for $x^{z_2}$ using the instantiated predictive model.

Referring to FIG. 5B, in an operation 520, total vector t is updated to add first prediction value vector $y_1$ and to subtract second prediction value vector $y_2$, for example, using $t = t + y_1 - y_2$.

In an operation 522, a determination is made concerning whether or not there is another observation vector of the number of observation vectors to use $n_{ov}$ to process. When there is another observation vector to process, processing continues in operation 504. When there is not another observation to process, processing continues in an operation 524.

In operation 524, a Shapley estimate value $\phi_i$ is computed for the variable of the plurality of variables indicated by the variable index i, for example, using $\phi_i = t/n_{ov}$.

Similar to operation 350, in an operation 526, a determination is made concerning whether or not the plurality of variables includes another variable. When the plurality of variables includes another variable, processing continues in an operation 528. When the plurality of variables does not include another variable, processing continues in operation 354. For example, i<m when the plurality of variables includes another variable.

Similar to operation 352, in operation 528, the variable index i is incremented, for example, using i=i+1, and processing continues in operation 502.

The third variant of feature contribution application 128 similarly includes operations 354 to 360 as shown referring to FIG. 5B.

To verify the performance improvements using feature contribution application 128, feature contribution application 128 was used to estimate the Shapley values of the input variables using a DMAHART dataset that includes physiological data from heart patients as training dataset 124 as summarized in Table I below.

TABLE I

| Variable # | Variable Name | Label |
| --- | --- | --- |
| 1 | age | INT: age |
| 4 | bpress | INT: resting blood pressure |
| 6 | bsugar | BIN: fasting blood sugar > 120 mg/dl |
| 12 | ca | ORD: number of major vessels (0-3) colored by flourosopy |
| 5 | chol | INT: serum cholestoral in mg/dl |
| 7 | ekg | NOM: resting electrocardiographic results |
| 9 | exang | BIN: exercise induced angina |
| 10 | oldpeak | INT: ST depression induced by exercise relative to rest |
| 3 | pain | NOM: chest pain type |
| 2 | sex | BIN: sex |
| 11 | slope | ORD: slope of the peak exercise ST segment |
| 14 | target | ORD: number of major vessels (0-4) reduced in diameter by more than 50% |
| 13 | thal | NOM: thal |
| 8 | thalach | INT: maximum heart rate achieved |

The target variable was a number of major blood vessels in a patient with a diameter restricted more than 50%. Four machine learning models were trained to predict this target given eight other variables in the data. After training the four machine learning models, the following process occurs ten times. One observation from the training dataset 124 is chosen randomly and one of the four machine learning models is chosen randomly. For each of the ten times, the Shapley values of the input variables estimated using a first existing method labeled BREAKDOWN, a second existing method labeled KERNAL1K, and a third existing method labeled KERNAL200. Details regarding the first existing method labeled BREAKDOWN can be found with reference to Staniak, Mateusz, and Przemyslaw Biecek, *Explanations of model predictions with live and breakDown packages*, arXiv preprint arXiv:1804.01955 (2018). The second existing method labeled KERNAL1K and the third existing method labeled KERNAL200 are the identical method though using different values to control the computation. Details regarding the second existing method labeled KERNAL1K and the third existing method labeled KERNAL200 can be found with reference to Lundberg, Scott M., and Su-In Lee, *A unified approach to interpreting model predictions*, Advances in Neural Information Processing Systems (2017). Four different versions of feature contribution application 128 were also executed where ($\chi$, $n_{ov}$). When $n_{ov}=0$, all observation vectors included in training dataset 124 were used as described in FIGS. 3A and 3B. When $n_{ov} \neq 0$, sampling of observation vectors included in training dataset 124 was used as described in FIG. 5.

Figure 10:
FIG. 10 depicts a comparison of a relative execution time of a plurality of algorithms in computing a feature contribution for a first dataset in accordance with an illustrative embodiment.
Figure 11:
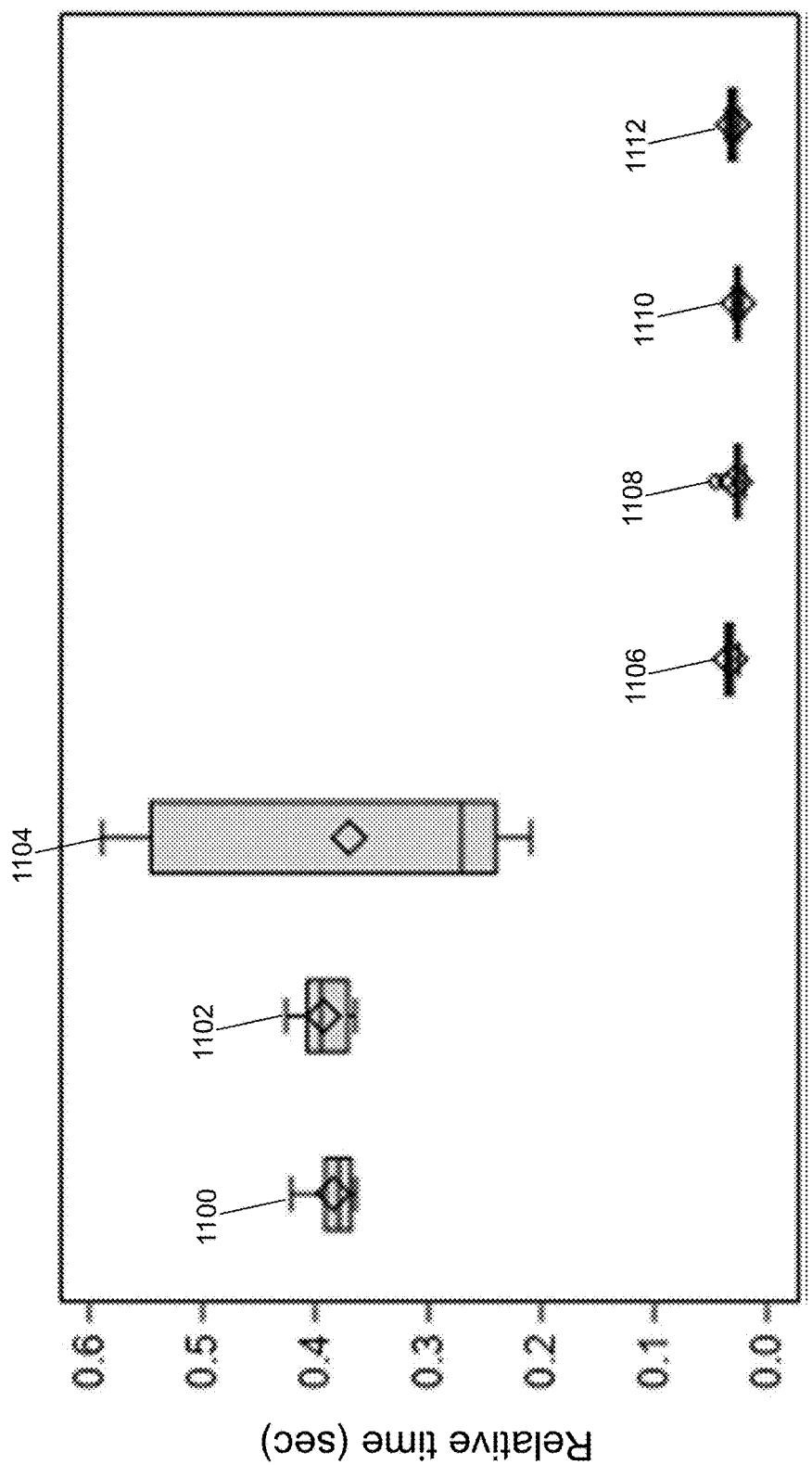
FIG. 11 depicts a graph of the comparison of FIG. 10 in accordance with an illustrative embodiment.

Referring to FIG. 10, a relative execution time table 1000 is shown that includes a comparison of the plurality of algorithms in computing a feature contribution using the DMAHART dataset as training dataset 124. Referring to FIG. 11, a graph of the comparison of FIG. 10 is shown. A first box plot 1100 indicates a timing distribution using the third existing method. A second box plot 1102 indicates a timing distribution using the second existing method. A third box plot 1104 indicates a timing distribution using the first existing method. A fourth box plot 1106 indicates a timing distribution using feature contribution application 128 with $\chi=1$ and $n_{ov}=0$. A fifth box plot 1108 indicates a timing distribution using feature contribution application 128 with $\chi=1$ and $n_{ov}=200$. A sixth box plot 1110 indicates a timing distribution using feature contribution application 128 with $\chi=m/2$ and $n_{ov}=200$. A seventh box plot 1112 indicates a timing distribution using feature contribution application 128 with $\chi=m/2$ and $n_{ov}=1000$.

Figure 12:
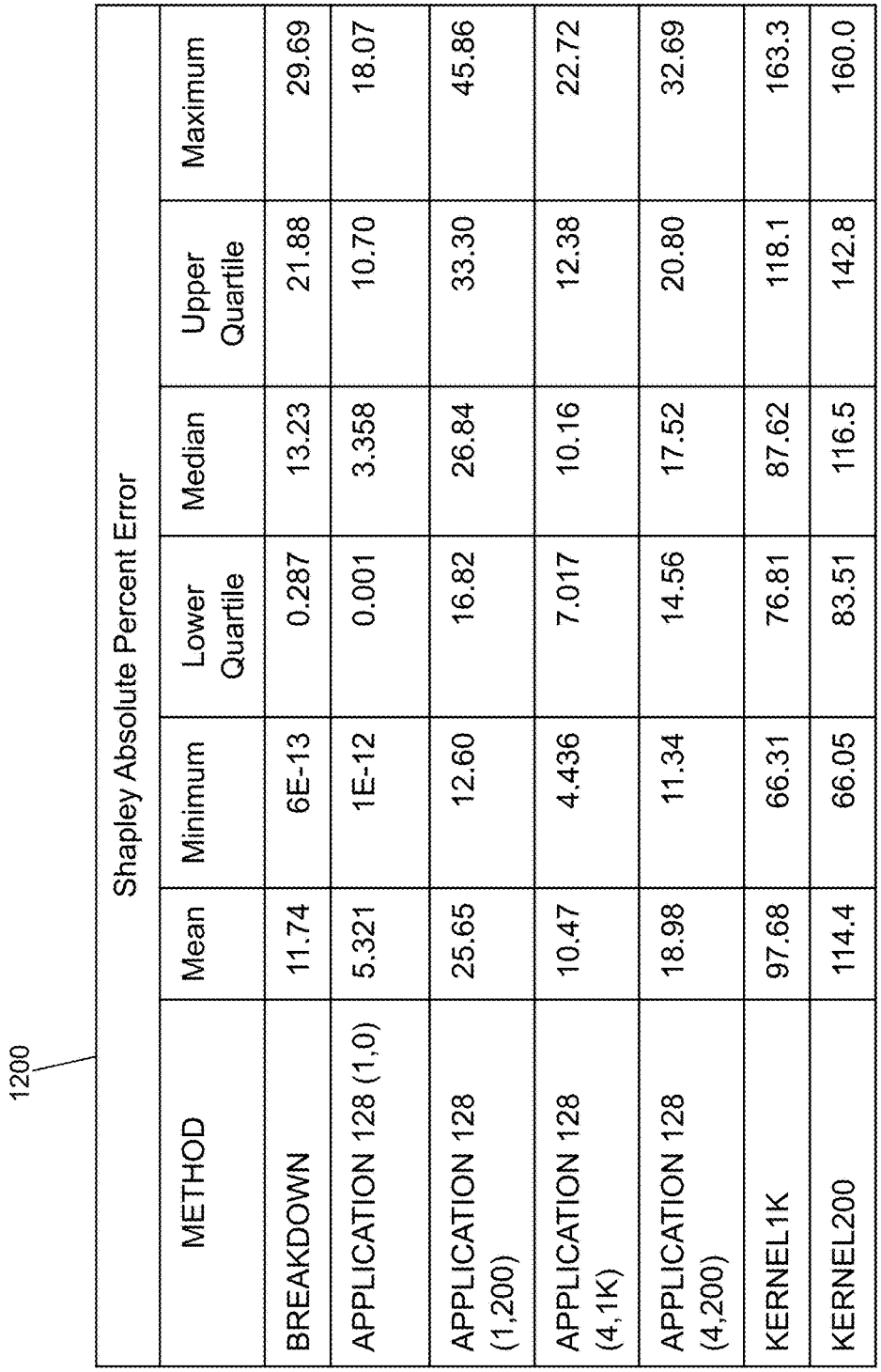
FIG. 12 depicts a comparison of a Shapley absolute percent error generated by a plurality of algorithms in computing a feature contribution for a first dataset in accordance with an illustrative embodiment.
Figure 13:
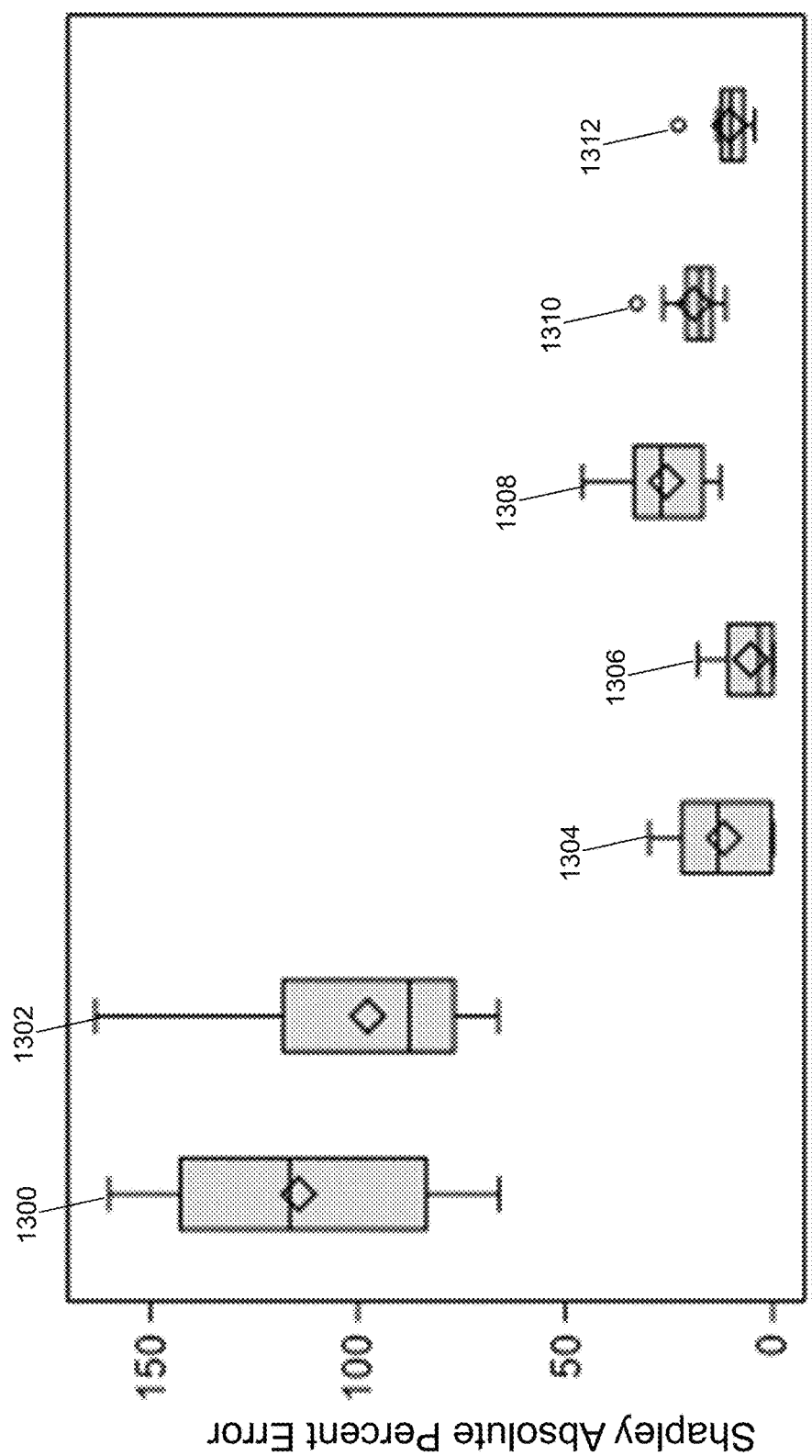
FIG. 13 depicts a graph of the comparison of FIG. 12 in accordance with an illustrative embodiment.

Referring to FIG. 12, a Shapley absolute percent error table 1200 is shown that includes a comparison of the plurality of algorithms in computing a feature contribution using the DMAHART dataset as training dataset 124. Referring to FIG. 13, a graph of the comparison of FIG. 12 is shown. A first box plot 1300 indicates an error distribution using the third existing method. A second box plot 1302 indicates an error distribution using the second existing method. A third box plot 1304 indicates an error distribution using the first existing method. A fourth box plot 1306 indicates an error distribution using feature contribution application 128 with $\chi=1$ and $n_{ov}=0$. A fifth box plot 1308 indicates an error distribution using feature contribution application 128 with $\chi=1$ and $n_{ov}=200$. A sixth box plot 1310 indicates an error distribution using feature contribution application 128 with $\chi=m/2$ and $n_{ov}=200$. A seventh box plot 1312 indicates an error distribution using feature contribution application 128 with $\chi=m/2$ and $n_{ov}=1000$.

Figure 15:
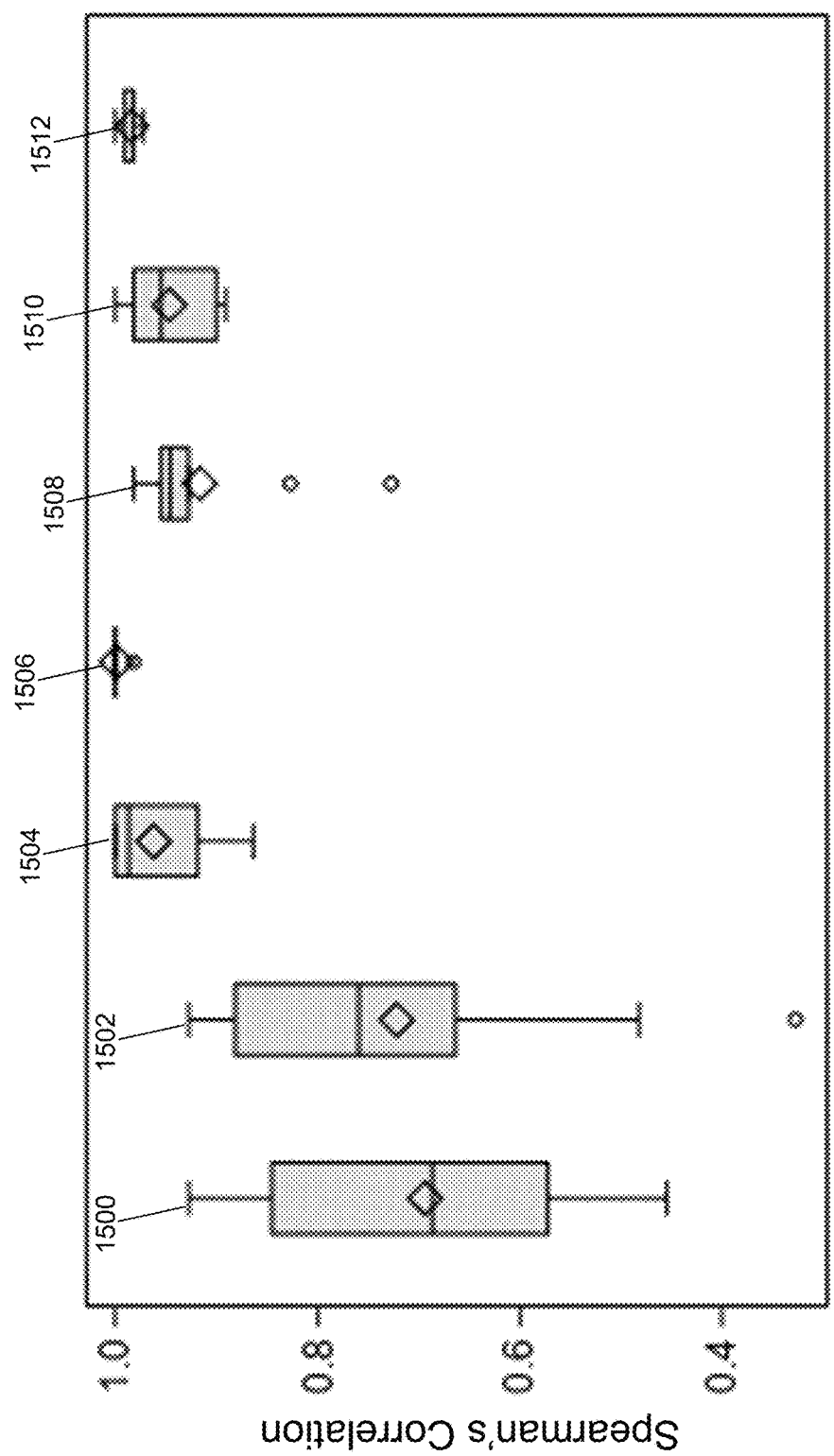
FIG. 15 depicts a graph of the comparison of FIG. 14 in accordance with an illustrative embodiment.

Referring to FIG. 14, a Spearman's correlation table 1400 is shown that includes a comparison of the plurality of algorithms in computing a feature contribution using the DMAHART dataset as training dataset 124. Referring to FIG. 15, a graph of the comparison of FIG. 14 is shown in accordance with an illustrative embodiment. A first box plot 1500 indicates a Spearman's correlation distribution using the third existing method. A second box plot 1502 indicates a Spearman's correlation distribution using the second existing method. A third box plot 1504 indicates a Spearman's correlation distribution using the first existing method. A fourth box plot 1506 indicates a Spearman's correlation distribution using feature contribution application 128 with $\chi=1$ and $n_{ov}=0$. A fifth box plot 1508 indicates a Spearman's correlation distribution using feature contribution application 128 with $\chi=1$ and $n_{ov}=200$. A sixth box plot 1510 indicates a Spearman's correlation distribution using feature contribution application 128 with $\chi=m/2$ and $n_{ov}=200$. A seventh box plot 1512 indicates a Spearman's correlation distribution using feature contribution application 128 with $\chi=m/2$ and $n_{ov}=1000$.

From the results using the DMAHART dataset as training dataset 124, feature contribution application 128 provides a lower error and a higher Spearman's correlation than the BREAKDOWN existing method except when $n_{ov}=200$. From the results using the DMAHART dataset as training dataset 124, feature contribution application 128 outperforms the Kernel SHAP existing methods in all cases. Feature contribution application 128 is 10 to 14 times faster than the BREAKDOWN and the Kernel SHAP existing methods. The feature contribution application 128 results using different values for $\chi$ and $n_{ov}$ are competitive with each other with a best option likely being problem-dependent. For example, the $\chi$ and $n_{ov}$ values have different SHAPE/Pearson/speed value combinations per problem.

To verify the performance improvements using feature contribution application 128, feature contribution application 128 was also used to estimate the Shapley values of the input variables using an SNRA dataset that includes a collection of satellite images as training dataset 124 as summarized in Table 2 below.

TABLE II

| Variable # | Variable Name |
|---|---|
| 4 | Blue |
| 14 | Elevation |
| 5 | Green |
| 10 | Greenness |
| 16 | ID |
| 13 | NDVI |
| 7 | NearInfrared |
| 12 | NoneSuch |
| 8 | Panchromatic |
| 6 | Red |
| 9 | SoilBrightness |
| 1 | Type |
| 15 | TypeCode |
| 2 | X |
| 3 | Y |
| 11 | Yellowness |

The data was originally collected to study the damage to pine forests from mountain pine beetles. The target was a classification of the vegetation in each image. Again, four machine learning models were trained to predict this target given ten other variables in the data.

Figure 17:
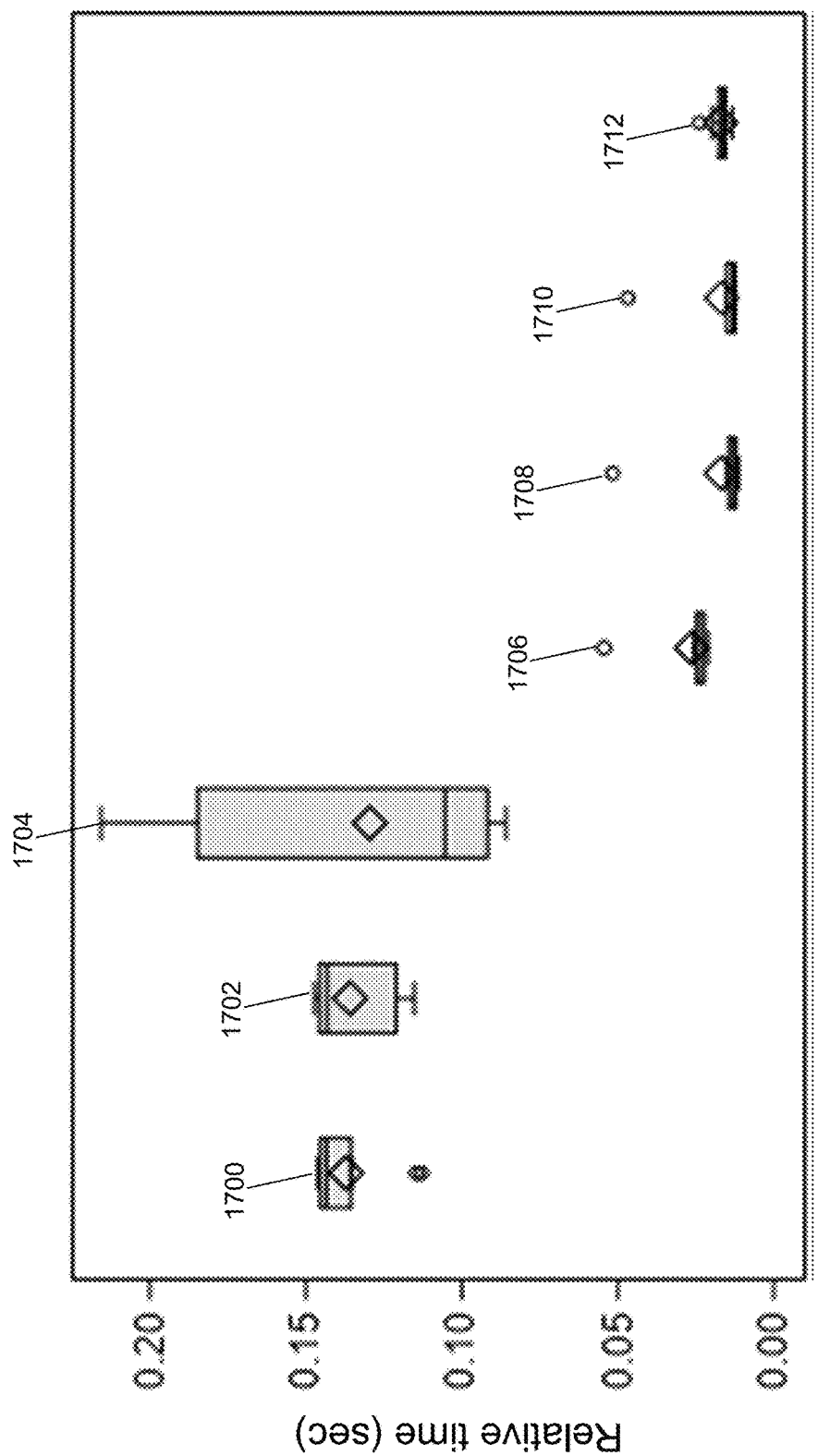
FIG. 17 depicts a graph of the comparison of FIG. 16 in accordance with an illustrative embodiment.

Referring to FIG. 16, a relative execution time table 1600 is shown that includes a comparison of the plurality of algorithms in computing a feature contribution using the SNRA dataset as training dataset 124. Referring to FIG. 17, a graph of the comparison of FIG. 16 is shown. A first box plot 1700 indicates a timing distribution using the third existing method. A second box plot 1702 indicates a timing distribution using the second existing method. A third box plot 1704 indicates a timing distribution using the first existing method. A fourth box plot 1706 indicates a timing distribution using feature contribution application 128 with $\chi=1$ and $n_{ov}=0$. A fifth box plot 1708 indicates a timing distribution using feature contribution application 128 with $\chi=1$ and $n_{ov}=200$. A sixth box plot 1710 indicates a timing distribution using feature contribution application 128 with $\chi=m/2$ and $n_{ov}=200$. A seventh box plot 1712 indicates a timing distribution using feature contribution application 128 with $\chi=m/2$ and $n_{ov}=1000$.

Figure 18:
FIG. 18 depicts a comparison of a Shapley absolute percent error generated by a plurality of algorithms in computing a feature contribution for a second dataset in accordance with an illustrative embodiment.
Figure 19:
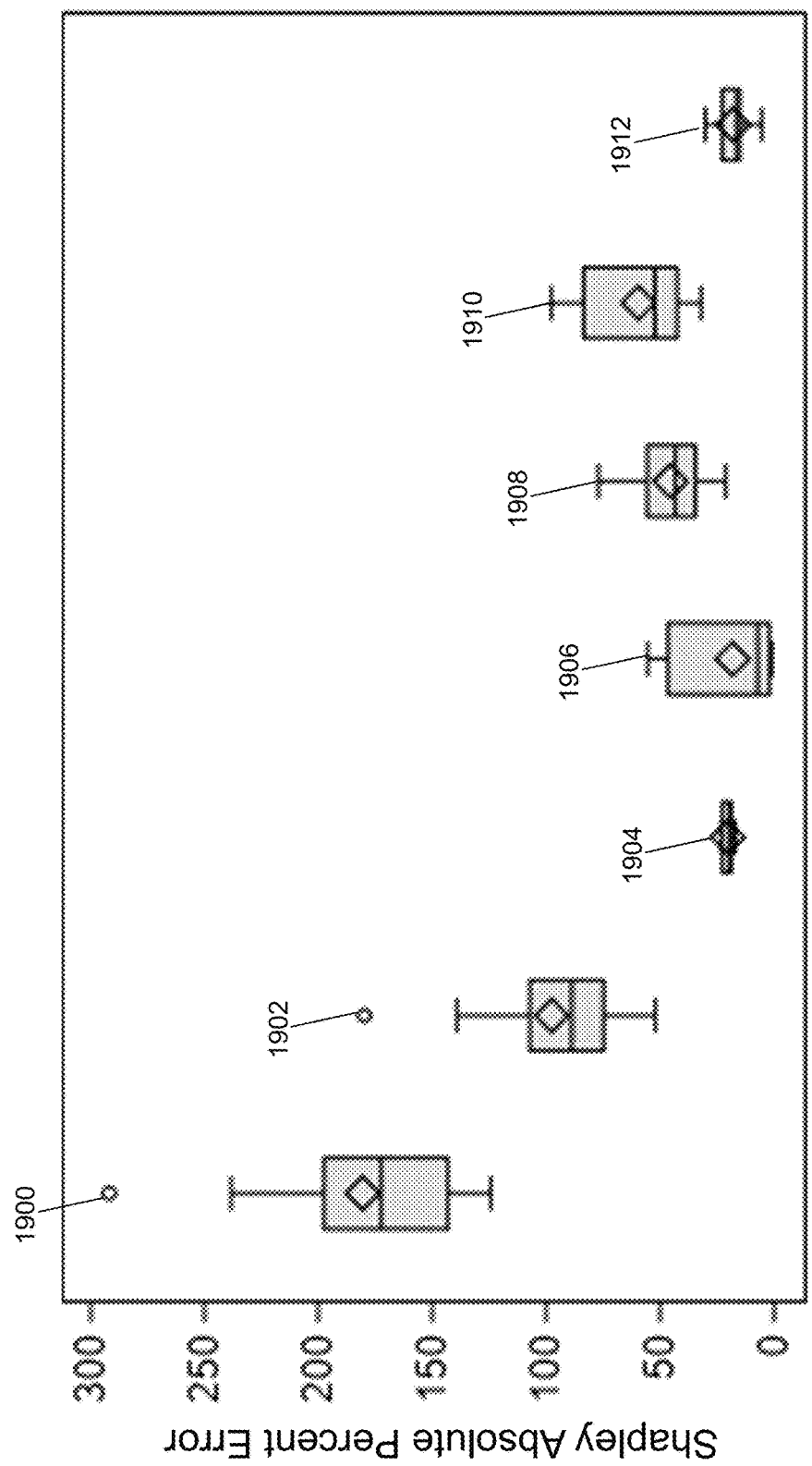
FIG. 19 depicts a graph of the comparison of FIG. 18 in accordance with an illustrative embodiment.

Referring to FIG. 18, a Shapley absolute percent error table 1800 is shown that includes a comparison of the plurality of algorithms in computing a feature contribution using the SNRA dataset as training dataset 124. Referring to FIG. 19, a graph of the comparison of FIG. 18 is shown. A first box plot 1900 indicates an error distribution using the third existing method. A second box plot 1902 indicates an error distribution using the second existing method. A third box plot 1904 indicates an error distribution using the first existing method. A fourth box plot 1906 indicates an error distribution using feature contribution application 128 with $\chi=1$ and $n_{ov}=0$. A fifth box plot 1908 indicates an error distribution using feature contribution application 128 with $\chi=1$ and $n_{ov}=200$. A sixth box plot 1910 indicates an error distribution using feature contribution application 128 with $\chi=m/2$ and $n_{ov}=200$. A seventh box plot 1912 indicates an error distribution using feature contribution application 128 with $\chi=m/2$ and $n_{ov}=1000$.

Figure 21:
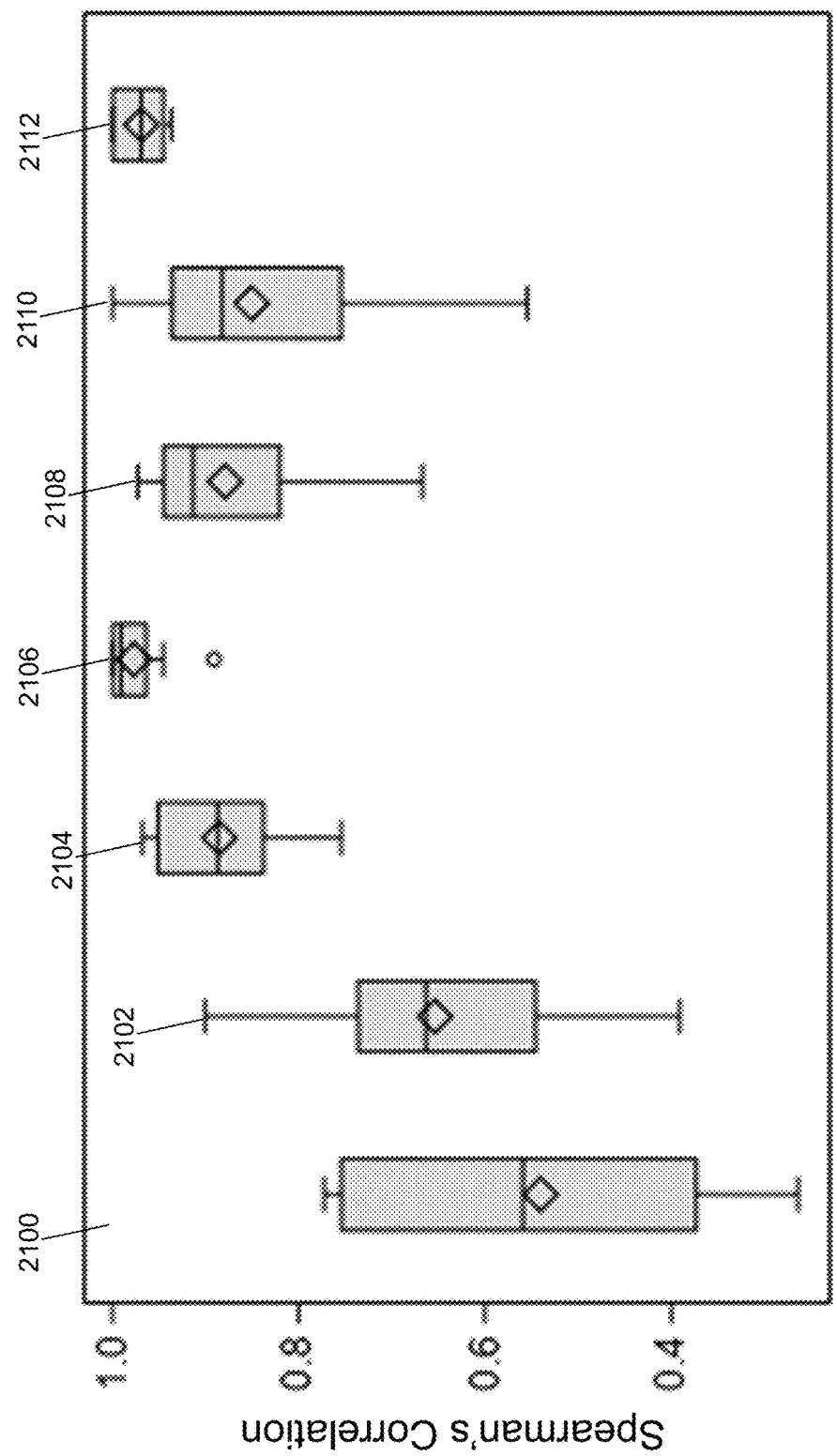
FIG. 21 depicts a graph of the comparison of FIG. 20 in accordance with an illustrative embodiment.

Referring to FIG. 20, a Spearman's correlation table 2000 is shown that includes a comparison of the plurality of algorithms in computing a feature contribution using the SNRA dataset as training dataset 124. Referring to FIG. 21, a graph of the comparison of FIG. 20 is shown in accordance with an illustrative embodiment. A first box plot 2100 indicates a Spearman's correlation distribution using the third existing method. A second box plot 2102 indicates a Spearman's correlation distribution using the second existing method. A third box plot 2104 indicates a Spearman's correlation distribution using the first existing method. A fourth box plot 2106 indicates a Spearman's correlation distribution using feature contribution application 128 with $\chi=1$ and $n_{ov}=0$. A fifth box plot 2108 indicates a Spearman's correlation distribution using feature contribution application 128 with $\chi=1$ and $n_{ov}=200$. A sixth box plot 2110 indicates a Spearman's correlation distribution using feature contribution application 128 with $\chi=m/2$ and $n_{ov}=200$. A seventh box plot 2112 indicates a Spearman's correlation distribution using feature contribution application 128 with $\chi=m/2$ and $n_{ov}=1000$.

From the results using the SNRA dataset as training dataset 124, feature contribution application 128 provides a lower error and a higher Spearman's correlation than the BREAKDOWN existing method except when $n_{ov}=200$. From the results using the SNRA dataset as training dataset 124, feature contribution application 128 outperforms the Kernel SNAP existing methods in all cases. Feature contribution application 128 is 4 to 6 times faster than the BREAKDOWN and the Kernel SNAP existing methods. The feature contribution application 128 results using different values for $\chi$ and $n_{ov}$ are competitive with each other with a best option likely being problem-dependent.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
    define a selection vector matrix that includes a plurality of selection vectors determined based on a predefined depth value, wherein each selection vector of the plurality of selection vectors indicates when a variable value of a plurality of variable values is replaced in an observation vector;

(A) select a next selection vector from the defined selection vector matrix;

(B) define a feature computation dataset based on the selected next selection vector, wherein the feature computation dataset is at least a partial copy of a training dataset with the variable value of the plurality of variable values replaced in each observation vector included in the feature computation dataset based on the selected next selection vector, wherein each replaced variable value is replaced with a value included in a predefined query for a respective variable;

(C) compute a prediction value for each observation vector included in the defined feature computation dataset using a trained predictive model;

(D) compute an expected value for the selected selection vector based on the computed prediction value for each observation vector included in the defined feature computation dataset;

(E) repeat (A) to (D) a predefined plurality of times;

(F) compute a Shapley estimate value for each variable of a plurality of variables using the expected value computed for each selected selection vector, wherein each variable value of the plurality of variable values is associated with one variable of the plurality of variables; and (G) output the computed Shapley estimate value for each variable of the plurality of variables as a contribution of each variable to a predicted value for the predefined query.

2. The non-transitory computer-readable medium of claim 1, wherein the at least partial copy of the training dataset includes all of the observation vectors included in the training dataset.

3. The non-transitory computer-readable medium of claim 2, wherein the predefined plurality of times is defined based on a number of selection vectors included in the defined selection vector matrix.

4. The non-transitory computer-readable medium of claim 1, wherein after (E), the computer-readable instructions further cause the computing device to:

compute a Shapley intercept value; and output the computed Shapley intercept value as an estimate of the average predicted value on the training dataset.

5. The non-transitory computer-readable medium of claim 4, wherein the Shapley intercept value is computed using $$\phi_0 = f(q) - \sum_{i=1}^{m} \phi_i,$$

where f(q) is a prediction value computed for the variable values defined in the predefined query using the trained predictive model, $\phi_i$ is the Shapley estimate value computed for each variable of the plurality of variables, and m is a number of the plurality of variables.

6. The non-transitory computer-readable medium of claim 4, wherein the computed Shapley intercept value is output to a display device.

7. The non-transitory computer-readable medium of claim 1, wherein defining the selection vector matrix comprises, for each value of $$k, Z^k \in \{0, 1\}^{\binom{m}{k} \times m},$$

where $Z^k$ is a partial selection matrix whose rows form a set $z \in \{0,1\}^m : |z|=k$, where z is a selection vector, m is a number of the plurality of variables, and k=0, ..., $\chi$, m-$\chi$, ..., m, where $\chi$ is the predefined depth value.

8. The non-transitory computer-readable medium of claim 7, wherein for each value of k, $$Z = \begin{bmatrix} Z \\ Z^k \end{bmatrix},$$

where Z is the selection vector matrix initialized as an empty matrix.

9. The non-transitory computer-readable medium of claim 1, wherein defining the selection vector matrix comprises:

adding a zero cardinality vector that includes a zero value for each variable of the plurality of variables to the selection vector matrix;

adding a full cardinality vector that includes a one value for each variable of the plurality of variables to the selection vector matrix; and for a group size value that is successively each value of the predefined depth value that is greater than zero and less than or equal to the predefined depth value, adding a first plurality of cardinality vectors to the selection vector matrix that each have the one value for a group of variables of the plurality of variables and the zero value for each remaining variable of the plurality of variables not included in the group of variables, wherein a size of the group of variables is the group size value; and adding a second plurality of cardinality vectors to the selection vector matrix that each have the zero value for the group of variables of the plurality of variables and the one value for each remaining variable of the plurality of variables not included in the group of variables.

10. The non-transitory computer-readable medium of claim 1, wherein the computed Shapley estimate value for each variable of the plurality of variables is output to a display device.

11. The non-transitory computer-readable medium of claim 1, wherein the contribution of each variable to the predicted value explains an operation of a system modeled by the trained predictive model.

12. The non-transitory computer-readable medium of claim 1, wherein, before (C), the computer-readable instructions further cause the computing device to:

train a predictive model using a second training dataset; and output the trained predictive model.

13. The non-transitory computer-readable medium of claim 12, wherein the second training dataset includes all of the observation vectors included in the training dataset.

14. The non-transitory computer-readable medium of claim 1, wherein, before defining the selection vector matrix, the computer-readable instructions further cause the computing device to:

instantiate an ESP engine (ESPE) on the computing device;

receive an event block object by the instantiated ESPE in a first event stream from a second computing device; and process the received event block object by the instantiated ESPE defining the selection vector matrix and performing (A) to (G), wherein the computed Shapley estimate value for each variable of the plurality of variables is output by the instantiated ESPE.

15. The non-transitory computer-readable medium of claim 14, wherein the computed Shapley estimate value for each variable of the plurality of variables is output to a third computing device in an event stream.

16. The non-transitory computer-readable medium of claim 15, wherein the third computing device presents the computed Shapley estimate value for each variable of the plurality of variables using a display device.

17. The non-transitory computer-readable medium of claim 14, wherein the predefined query is received from the second computing device.

18. The non-transitory computer-readable medium of claim 14, wherein the predefined depth value is received from the second computing device.

19. The non-transitory computer-readable medium of claim 1, wherein before (C), the computer-readable instructions further cause the computing device to repeat (A) to (B) for a predefined batch size number of selection vectors, wherein the defined feature computation dataset is updated to include each selected next selection vector.

20. The non-transitory computer-readable medium of claim 1, wherein after (G), the computer-readable instructions further cause the computing device to:
repeat (A) to (G) with a second predefined query.

21. The non-transitory computer-readable medium of claim 1, wherein computing the Shapley estimate value for each variable of a plurality of variables comprises:
selecting a variable of the plurality of variables;
(H) computing a weight function value for a row index based on the predefined depth value and a number of the plurality of variables for the selected variable;
(I) computing a weight vector value for the row index based on the computed weight function value, the predefined depth value, and a number of the plurality of variables;
(J) incrementing the row index;
(K) repeating (H) to (J) the predefined plurality of times, wherein the Shapley estimate value is further computed for the selected variable using a computed weight vector defined from the computed weight vector value for each row index; and
(L) repeating (H) to (K) with each remaining variable of the plurality of variables as the selected variable.

22. The non-transitory computer-readable medium of claim 21, wherein the weight function value is computed using $$\omega_\chi(b_j) = \begin{cases} \frac{b_j!(m-b_j-1)!}{m!} \cdot \frac{m}{2\chi}, & \text{if } \chi < \lceil m/2 \rceil \\ \frac{b_j!(m-b_j-1)!}{m!}, & \text{otherwise} \end{cases}$$

where $b_j$ is a row sum of the defined selection vector matrix excluding an $i^{th}$ column defined by the row index, $\chi$ is the predefined depth value, m is the number of the plurality of variables.

23. The non-transitory computer-readable medium of claim 22, wherein the weight vector value is computed using $$v_j = \begin{cases} (2a_j-1)\omega_\chi(b_j), & \text{if } b_j \le \chi-1 \text{ or } b_j \ge m-\chi \\ 0, & \text{otherwise} \end{cases}$$

where $a_j$ is the $i^{th}$ column defined selection vector matrix.

24. The non-transitory computer-readable medium of claim 21, wherein the Shapley estimate value is computed for the selected variable using $\phi_i = v^T \mu$, where v is the weight vector, and $\mu$ is an expected value vector defined using the expected value computed for each selected selection vector.

25. A computing device comprising:
a processor; and
a non-transitory computer-readable medium operably coupled to the processor, the computer-readable medium having computer-readable instructions stored thereon that, when executed by the processor, cause the computing device to
define a selection vector matrix that includes a plurality of selection vectors determined based on a predefined depth value, wherein each selection vector of the plurality of selection vectors indicates when a variable value of a plurality of variable values is replaced in an observation vector;
(A) select a next selection vector from the defined selection vector matrix;
(B) define a feature computation dataset based on the selected next selection vector, wherein the feature computation dataset is at least a partial copy of a training dataset with the variable value of the plurality of variable values replaced in each observation vector included in the feature computation dataset based on the selected next selection vector, wherein each replaced variable value is replaced with a value included in a predefined query for a respective variable;
(C) compute a prediction value for each observation vector included in the defined feature computation dataset using a trained predictive model;
(D) compute an expected value for the selected selection vector based on the computed prediction value for each observation vector included in the defined feature computation dataset;
(E) repeat (A) to (D) a predefined plurality of times;
(F) compute a Shapley estimate value for each variable of a plurality of variables, wherein each variable value of the plurality of variable values is associated with one variable of the plurality of variables; and
(G) output the computed Shapley estimate value for each variable of the plurality of variables as a contribution of each variable to a predicted value for the predefined query.

26. A method for determining a contribution of a feature to a predicted value, the method comprising:
defining, by a computing device, a selection vector matrix that includes a plurality of selection vectors determined based on a predefined depth value, wherein each selection vector of the plurality of selection vectors indicates when a variable value of a plurality of variable values is replaced in an observation vector;
(A) selecting, by the computing device, a next selection vector from the defined selection vector matrix;
(B) defining, by the computing device, a feature computation dataset based on the selected next selection vector, wherein the feature computation dataset is at least a partial copy of a training dataset with the variable value of the plurality of variable values replaced in each observation vector included in the feature computation dataset based on the selected next selection vector, wherein each replaced variable value is replaced with a value included in a predefined query for a respective variable;
(C) computing, by the computing device, a prediction value for each observation vector included in the defined feature computation dataset using a trained predictive model;
(D) computing, by the computing device, an expected value for the selected selection vector based on the computed prediction value for each observation vector included in the defined feature computation dataset;
(E) repeating, by the computing device, (A) to (D) a predefined plurality of times;
(F) computing, by the computing device, a Shapley estimate value for each variable of a plurality of variables, wherein each variable value of the plurality of variable values is associated with one variable of the plurality of variables; and
(G) outputting, by the computing device, the computed Shapley estimate value for each variable of the plurality of variables as a contribution of each variable to a predicted value for the predefined query.

27. The method of claim 26, wherein defining the selection vector matrix comprises, for each value of $$k, Z^k \in \{0,1\}^{\binom{m}{k} \times m},$$

where $Z_K$ is a partial selection matrix whose rows form a set $z \in \{0,1\}^m : |z|=k$, where z is a selection vector, m is a number of the plurality of variables, and k=0, ..., $\chi$, m-$\chi$, ..., m, where $\chi$ is the predefined depth value.

28. The method of claim 26, wherein defining the selection vector matrix comprises:
adding a zero cardinality vector that includes a zero value for each variable of the plurality of variables to the selection vector matrix;
adding a full cardinality vector that includes a one value for each variable of the plurality of variables to the selection vector matrix; and
for a group size value that is successively each value of the predefined depth value that is greater than zero and less than or equal to the predefined depth value,
adding a first plurality of cardinality vectors to the selection vector matrix that each have the one value for a group of variables of the plurality of variables and the zero value for each remaining variable of the plurality of variables not included in the group of variables, wherein a size of the group of variables is the group size value; and
adding a second plurality of cardinality vectors to the selection vector matrix that each have the zero value for the group of variables of the plurality of variables and the one value for each remaining variable of the plurality of variables not included in the group of variables.

29. The method of claim 26, wherein the contribution of each variable to the predicted value explains an operation of a system modeled by the trained predictive model.

30. The method of claim 26, wherein, before (C), further comprising:
training, by the computing device, a predictive model using a second training dataset; and
outputting, by the computing device, the trained predictive model.

* * * * *

UNITED STATES PATENT AND TRADEMARK OFFICE
CERTIFICATE OF CORRECTION

PATENT NO. : 10,510,022 B1
APPLICATION NO. : 16/451228
DATED : December 17, 2019
INVENTOR(S) : Ricky Dee Tharrington, Jr. et al.

It is certified that error appears in the above-identified patent and that said Letters Patent is hereby corrected as shown below:

In the Specification

Column 14, Line 7:
Delete the phrase "selection vectors is 2 m." and replace with --selection vectors is $2^m$.--.

Column 15, Line 40:
Delete the phrase "selection_matrix[i,selection_locs[k]] = 1;" and replace with --selection_matrix[i,selection_locs[k,]] = 1;--.

Column 16, Line 7:
Delete the phrase "$X_{[:,i]}{}^z = q_i 1_{N\times 1}$" and replace with --$X^z_{[:,i]} = q_i 1_{N\times 1}$--.

Column 16, Line 18:
Delete the phrase "$y_t = f(X_{[t,:]}{}^z)$, $t = 1, \ldots, N$." and replace with --$y_t = f(X^z_{[t,:]}), t = 1, \ldots, N$--.

Column 16, Line 34:
Delete the phrase "$1_{N\times 1}{}^T$" and replace with --$1^T_{N\times 1}$--.

Column 17, Line 23:
Delete the phrase "$\phi_i = v^T \mu$" and replace with --$\phi_i = v^\mathsf{T} \mu$--.

Column 24, Line 31:
Delete the phrase "Kernel SNAP" and replace with --Kernel SHAP--.

Column 24, Line 33:
Delete the phrase "Kernel SNAP" and replace with --Kernel SHAP--.

Signed and Sealed this
Third Day of March, 2020

Andrei Iancu
*Director of the United States Patent and Trademark Office*